United States Patent [19]

Katsura et al.

[11] Patent Number: 4,779,210

[45] Date of Patent: Oct. 18, 1988

[54] GRAPHIC PROCESSING APPARATUS

[75] Inventors: Koyo Katsura; Hideo Maejima; Hisashi Kajiwara, all of Hitachi, Japan

[73] Assignees: Hitachi Engineering, Co. Ltd.; Ltd. Hitachi, both of Tokyo, Japan

[21] Appl. No.: 727,850

[22] Filed: Apr. 26, 1985

[30] Foreign Application Priority Data

| May 2, 1984 | [JP] | Japan | 59-87907 |
| Jun. 14, 1984 | [JP] | Japan | 59-120679 |
| Nov. 30, 1984 | [JP] | Japan | 59-254889 |

[51] Int. Cl.[4] .................. G06F 15/20; G06F 3/153
[52] U.S. Cl. ..................... 364/521; 364/518; 364/900
[58] Field of Search ............ 364/518, 521, 200, 900; 340/723, 727, 747, 750, 744, 748; 355/86

[56] References Cited

U.S. PATENT DOCUMENTS

| 4,149,264 | 4/1979 | Hamada et al. | 364/900 |
| 4,177,514 | 12/1979 | Rupp | 364/200 |
| 4,233,601 | 11/1980 | Harkins et al. | 340/750 |
| 4,396,988 | 8/1983 | Fitzgerald et al. | 364/521 |
| 4,491,836 | 1/1985 | Collmeyer et al. | 340/747 |
| 4,492,956 | 1/1985 | Collmeyer et al. | 340/723 |
| 4,496,944 | 1/1985 | Collmeyer et al. | 340/727 |
| 4,510,568 | 4/1985 | Kishi et al. | 364/521 |

FOREIGN PATENT DOCUMENTS

| 174759 | 10/1982 | Japan | 364/521 |
| 33773 | 2/1983 | Japan | 364/521 |
| 2087696 | 5/1982 | United Kingdom |  |

*Primary Examiner*—Parshotam S. Lall
*Assistant Examiner*—V. N. Trans
*Attorney, Agent, or Firm*—Antonelli, Terry & Wands

[57] ABSTRACT

Herein disclosed is a graphic processing apparatus which uses a CRT of raster scanning type. The graphic processing apparatus has functions to compare and judge whether or not within the range of a predetermined region thereby to effect the drawing operation, to compare drawing picture element data and other data in the drawing operation thereby to arithmetically control the drawing picture element data in accordance with the compared result, and to drawing a pattern of an arbitrary size on the basis of a fundamental unit of line and design patterns in the drawing operation.

22 Claims, 22 Drawing Sheets

FIG. 7

| # | FUNCTION | 47-42 | 41-38 | 37-33 | 32 | 31-29 | 28-24 | 23-22 | 21-17 | 16-14 | 13 | 12 | 11-9 | 8 | 7-6 | 5-3 | 2-0 |
|---|---|---|---|---|---|---|---|---|---|---|---|---|---|---|---|---|---|
| 0 | FIFO CONTROL | RW/RU | | | | | | | | | FLAG | V | FIFO | | | BC | RB |
| 1 | LITERAL | RW | | | | | | | LITERAL | | | | | LC | | | |
| 2 | FLIP-FLOP CONTROL | RW/RU | | | | 000 | | AC | ADF-H | FLAG | | V | RU | FF | | | |
| 3 |  | RW | | FUNCA | SFT | 001 | ADF-L | | | | | | | | | | |
| 4 | CONDITION COMMAND CONTROL | RW/RU | RV | | | 100 | | | | FLAG | | RU | | ECD | | | |
| 5 |  | RW | | | | 101 | | FUNCB | | | | | | | | | |
| 6 | CONDITION DIVIDING CONTROL | RW/RU | | | | 010 | | | | FLAG | | RU | | BCD | SMC | DR | |
| 7 |  | RW | | | | 011 | | | | | | | | | | | |
|   |  |    | | | | 110 | | | | | | | | | | | |
|   |  |    | | | | 111 | | | | | | | | | | | |

FIG. 9

(a) 1 BIT/DISPLAY ELEMENT MODE
(GBM=000)
DISPLAY ELEMENT ADDRESS
MAD — WAD: 4 BITS (b) 2 BITS/DISPLAY ELEMENT MODE
(GBM=001)
DISPLAY ELEMENT ADDRESS
MAD — WAD: 3 BITS (c) 4 BITS/DISPLAY ELEMENT MODE
(GBM=010)
DISPLAY ELEMENT ADDRESS
MAD — WAD: 2 BITS (d) 8 BITS/DISPLAY ELEMENT MODE
(GBM=011)
DISPLAY ELEMENT ADDRESS
MAD — WAD: 1 BIT (e) 16 BITS/DISPLAY ELEMENT MODE
(GBM=100)
DISPLAY ELEMENT ADDRESS
MAD

FIG. 33
TABLE. 2

| OPM | CALCULATION MODE |
|---|---|
| 0 (000) | COLOR INFORMATION IS DISPLAYED. |
| 1 (001) | OR OF FRAME & COLOR INFORMATION. |
| 2 (010) | AND OF FRAME MEMORY & COLOR INFORMATION. |
| 3 (011) | EOR OF FRAME MEMORY & COLOR INFORMATION. |
| 4 (100) | DISPLAY IS TAKEN PLACE WHEN THE DATA OF DISPLAY POINT IS EQUAL TO THAT OF COMPARING COLOR REGISTER. |
| 5 (101) | DISPLAY IS TAKEN PLACE WHEN THE DATA OF DISPLAY POINT ISNT EQUAL TO THAT OF COMPARING COLOR REGISTER. |
| 6 (110) | DISPLAY IS TAKEN PLACE WHEN THE DATA OF DISPLAY POINT IS LARGER THAN DATA OF COLOR INFORMATION. |
| 7 (111) | DISPLAY IS TAKEN PLACE WHEN THE DATA OF DISPLAY POINT IS SMALLER THAN DATA OF COLOR INFORMATION. |

FIG. 20

(a) BIT ADDRES 0

(b) BIT ADDRES 4

(c) BIT ADDRES 8

(d) BIT ADDRES 16

FIG. 23
(a) 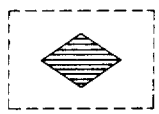
(b) 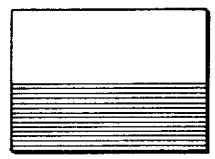
(c) 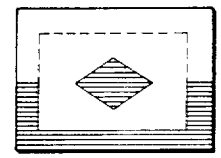
(d) 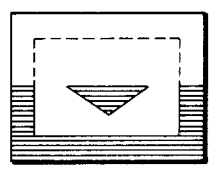
(e) 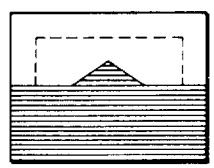
(f) 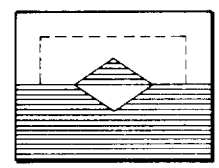
FIG. 24
(a) 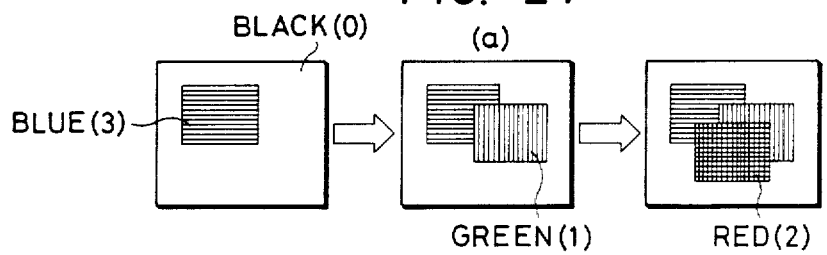
(b) 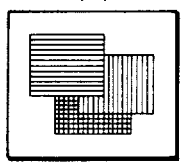
(c) 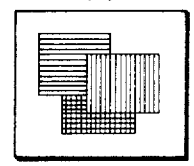
(d) 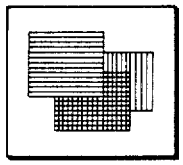
(e) 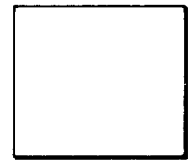

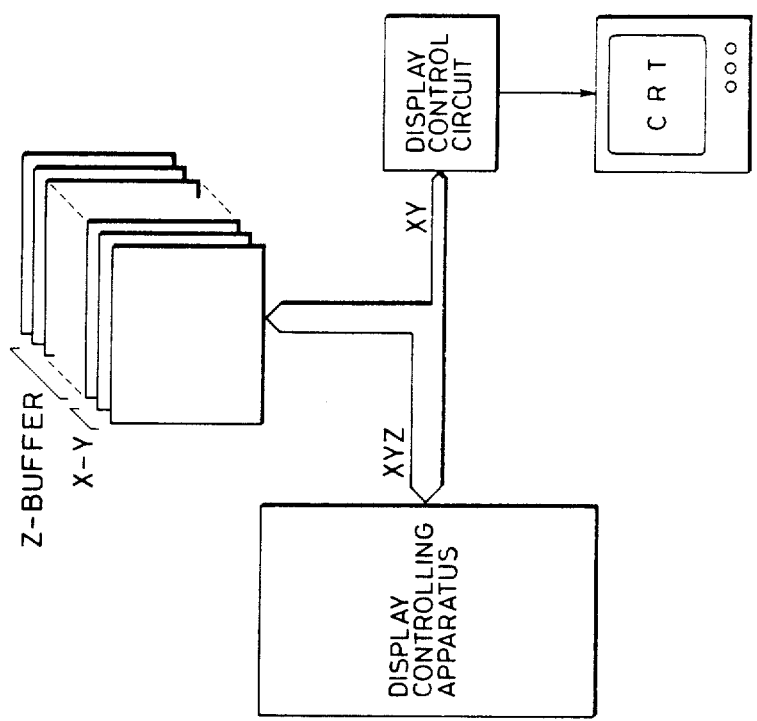
FIG. 26
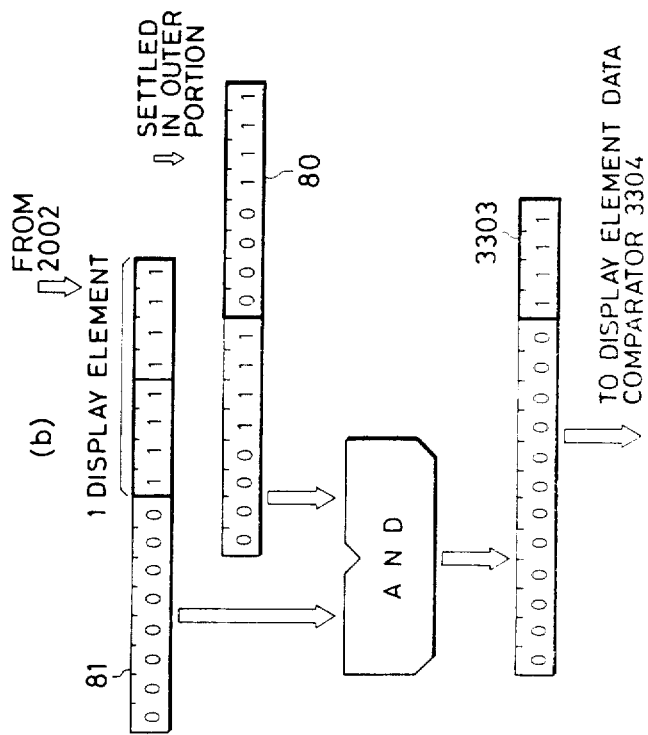
FIG. 25
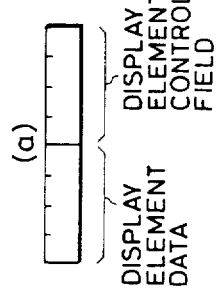

(A) PATTERN REGISTER 220   bit 0 [1 1 1 0 0 ---] bit 7

(B) PATTERN OUTPUT   1 1 1 0 0 1 1 1 0 0 1 1 1 0 0

FIG. 32

TABLE. 1

| AREA | CONTENT OF DISPLAY AREA DETECTION MODE |
|---|---|
| 000 | DISPLAY AREA DECISION DOESN'T TAKE PLACE. |
| 001 | DETECTION FLAG IS SET WHEN DISPLAY POSITION GOES OUT THE DEFINED AREA, AND DISPLAY IS STOPPED. |
| 010 | WHEN DISPLAY POSITION GOES OUT THE DEFINED AREA, DISPLAY DOESN'T TAKE PLACE, AND CO-ORDINATE CALCULATION IS CONTINUED. DETECTION FLAG ISNT SET. |
| 011 | WHEN DISPLAY POSITION GOES OUT THE DEFINED AREA, DISPLAY DOESN'T TAKE PLACE, AND CO-ORDINATES CALCULATION IS CONTINUED. DETECTION FLAG IS SET. |
| 100 | DISPLAY AREA DECISION DOESN'T TAKE PLACE. |
| 101 | WHEN DISPLAY POSITION COMES INTO THE DEFINED AREA, DEFINED FLAG IS SET. DISPLAY IS STOPPED. |
| 110 | WHEN DISPLAY POSITION IS IN THE DEFINED AREA, DISPLAY DOESN'T TAKE PLACE, AND CO-ORDINATE CALCULATION IS CONTINUED. DETECTION FLAG ISNT SET. |
| 111 | WHEN DISPLAY POSITION IS IN THE DEFINED AREA, DISPLAY DOESN'T TAKE PLACE, AND CO-ORDINATE CALCULATION IS CONTINUED. DETECTION FLAG IS SET. |

GRAPHIC PROCESSING APPARATUS

BACKGROUND OF THE INVENTION

1. Field of the Invention

The present invention relates to a graphic processing apparatus including a microprocessor for inputting or outputting data or graphically displaying by means of a CRT (i.e., Cathode Ray Tube) display unit of raster scanning type and having a drawing function to control the microprocessor by a micro program which is stored in a micro program memory.

2. Description of the Prior Art

Most of CRT controllers of the prior art are used especially for display controls and do not have a drawing function. An example of the CRT controllers is disclosed in U.S. Pat. No. 4,149,264. On the other hand, a graphic processing apparatus having its graphic processing function realized by means of an integrated circuit is, if any, nothing but an apparatus for processing monochromatic graphic display data in which one picture element is expressed by one bit. In accordance with an increase in the data processing density, however, the graphic processing is frequently conducted in multiple colors and gradations, which raises a problem with respect to the processing rate. For processing in multiple (e.g., an n-number of) colors or gradations, it is necessary to repeat one graphic processing an n-number of times when it is desired to rewrite the memory content, or it is also necessary to repeat the graphic processing an n-number of times so as to display one picture element of one bit.

This raises a disadvantage in that a time duration of n-times is required for a binary graphic processing. There can be conceived a processing method in which processings are conducted by providing one processing unit for each of an n-number of display memories. However, this method raises problems that the required amount of processing is increased and that an additional load is placed upon the central processing unit.

In case it is intended to execute a drawing processing for drawing a straight line in an X-Y coordinate space using one arbitrary point as an origin, let a case be imagined, in which two arbitrary points $P_S (X_S, Y_S)$ and $P_E (X_E, Y_E)$ are joined by a straight line. In this case, graphic data is prepared for each point and written by computing the gradient of the straight line from the coordinate values of those two points and by computing the coordinate values of points on the straight line. These processings are sequentially conducted for all the points lying on the straight line. Since the coordinate values thus computed are absolutely different from the memory address of the display memory to be written with the graphic data, however, the coordinate values (or logical addresses) computed have to be transformed into display memory addresses (or physical addresses).

Incidentally, since the display memory has its one word containing single or plural picture element data, the logical addresses computed are transformed into two physical addresses, for example, the memory addresses of the display memory and further into the bit addresses for indicating the position of the picture element or elements.

For the transformations from the logical addresses into the physical addresses, it is necessary to know the physical addresses corresponding to the origin and the horizontal size of the frame memory. Since the logical addresses indicate the relative position from the origin, more specifically, the target memory addresses can be computed, in case the logical addresses are expressed by (X, Y), by adding to or subtracting from the physical addresses corresponding to the origin either the value which is obtained by multiplying the horizontal size of the frame memory by Y-times in the vertical (i.e., Y) direction or the value which is obtained by dividing the value X by the number of picture elements contained in one word in the horizontal (i.e., X) direction. Moreover, the physical addresses for processing graphic data are attained by using the surplus, which is obtained by dividing the value X by the number of the picture elements contained in one word, as the bit addresses.

Since, in the prior art, the computation of the logical addresses and the transformation into the physical addresses is implemented entirely by software program processing, however, it takes a time duration of up to several tens of micro seconds to store data for one picture element in the display memory in case a general purpose microprocessor is used. This results in the current state of the art in which the processings are not speeded up.

On the other hand, a graphic system for displaying letters or drawings in the frame of a CRT or the like performs a clipping processing so as to clip a drawing to be displayed into a frame having a predetermined size and to display it. This is because there is a limit to either the actual display frame or the capacity of the display memory for storing the frame data despite the fact that the graphic data providing the basis are arranged in a two- or three-dimensional infinite space.

As the clipping method of that kind, there is well known in the art an algorithm for determining an intersection of a rectangular region from the coordinate values of a terminal point of a straight line. This algorithm is explained, for example, in "W. M. Newman and R. F. Sproull: Principles of Interactive Computer Graphics (2nd edition)", McGraw-Hill (1979), pp. 65 to 68.

The clipping method of the prior art is effective because a drawing is decomposed into straight lines and displayed in most cases in the graphic terminal for the CAD (i.e., Computer Aided Design). On the contrary, relatively inexpensive system such as a personal computer does not have a processing unit especially for the clipping method, because it cannot have a complicated hardware built therein, but detects the terminal by means of a software so that its performance cannot be improved. Since, in this field, the clipping method is conducted by a general purpose processing unit, on the other hand, its application is limited to straight lines and cannot be extended to curves such as circles or ellipses.

On the other hand, many graphic systems conduct color or multi-gradation displays. In these systems, it is necessary to select that which is displayed at an overlapped portion by a plurality of drawings having different color or gradation data. This necessity results from the fact that the depth of each drawing is determined by the manner of displaying that overlapped portion so that the drawing is viewed absolutely different if the manner of the selection is different.

The most convenient method enabling that selection necessary in the prior art selects the drawing order by software processing. Specifically, the image is drawn from that to be located furthest to that to be located closest to the viewer so that the overlapped portion is drawn with the closest drawing which is ultimately the visible part. However, this method has to have its software changed, each time the manner of display at the overlapped portion is to be changed, to change its drawing order so that it is troublesome. Since the drawing order is regulated, moreover, it is difficult to describe the program for a complicated drawing. Moreover, it is difficult to apply the method under consideration to a movie processing in which only a portion of the drawing is sequentially changed while the background image is left as it is.

The graphic processing apparatus for forming a variety of drawings in a display or print frame memory is required to be able to select the kinds of lines such as solid or broken lines and the patterns to be smeared out.

In the prior art, the graphic processing apparatus having its line or design pattern fixed in size at a unit of an n-power of 2 has been used as one for storing that pattern because it can be easily controlled. If the apparatus handles the line data of eight bits, for example, this line data is attained more easily by counting with a counter of three bits and by selecting one bit from the position designated by the counter. In the case of the two-dimensional design pattern, too, there has been used a method of fixing likewise the longitudinal and transverse sizes at a unit of n-power of 2.

This method is accompanied by a defect that it cannot handle the line or design pattern which uses an arbitrary size as a basic unit.

On the other hand, the display control apparatus of that kind is also disclosed in GB No. 2,087,696A, for example.

SUMMARY OF THE INVENTION

An object of the present invention is to provide a graphic processing apparatus for monitoring a drawing region in real time when the coordinates of a point to be drawn are to be computed.

Another object of the present invention is to provide a graphic processing apparatus for processing the drawing arithmetic conditioned for color or gradation data at a high speed with a relatively simple construction.

Still another object of the present invention is to provide a graphic processing apparatus which is capable of drawing patterns of arbitrary size by using a line or design pattern as a basic unit.

According to a feature of the present invention, there is provided a graphic processing apparatus which comprises: means for storing the coordinate values of a point to be drawn; and means for renewing the arithmetic of the coordinate values, wherein the improvement comprises: means for storing predetermined region relating to the drawing; and means for comparing the result of the renewing arithmetic of said coordinate values when in the renewing arithmetic to detect whether said result is within a predetermined range, whereby said apparatus can monitor the region to be drawn in real time at high speed with a simple construction when the coordinate values of said point are to be computed.

According to another feature of the present invention, there is provided a graphic processing apparatus which comprises: means for comparing picture element data expressed in single or plural bits with other data; means for conducting arithmetic operations between the processed drawing picture element data and picture element data read from the outside; and means for controlling the picture element data arithmetic operation in accordance with said comparison result.

According to still another feature of the present invention, there is provided a graphic processing apparatus which comprises: a memory for storing a pattern, a register for storing the reference position of said pattern; an arithmetic unit for renewing the value of said pattern; a register for storing the reference range of said pattern; and a comparator for detecting whether or not said reference position of said pattern is within a limited range, whereby the pattern reference can be conducted repeatedly within said limited range.

BRIEF DESCRIPTION OF THE DRAWINGS

FIG. 7 is a diagram for explaining the functions of the respective fields of micro instructions;

FIG. 9 a–e diagrams corresponding to FIG. 8 for explaining picture element addresses;

FIG. 20 is a diagram exemplifying a bit address in the case of a mode of four bits per picture element;

FIGS. 23(a) to (f) are diagrams showing the examples of the graphic processing in operation modes 0 to 3;

FIGS. 24(a) to (e) are diagrams showing the examples of the graphic processing in the operation modes 0 and 4 to 7;

FIGS. 25(a) and (b) are diagrams showing another embodiment of the present invention;

FIG. 26 is a diagram showing an example of the construction of a system for conducting a three-dimensional graphic processing by using the embodiment of FIG. 25;

FIGS. 32 and 33 are respectively Table 1 and Table 2.

DETAILED DESCRIPTION OF THE PREFERRED EMBODIMENTS

Figure 1:
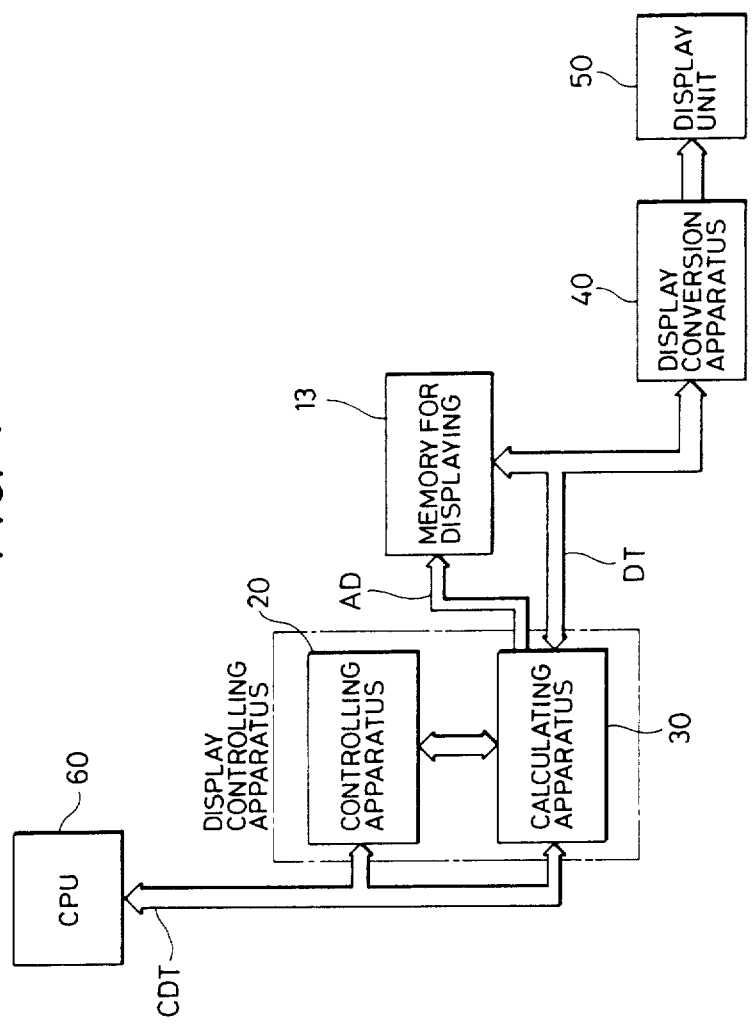
FIG. 1 is a block diagram showing the overall construction of the present invention.

FIG. 1 is a block diagram showing the overall construction of the graphic processing apparatus according to the present invention.

As shown in FIG. 1, the graphic processing apparatus is constructed of an arithmetic unit 30 for controlling the write, rewrite and read operations on the display data stored in a display memory 13; and a control unit 20 for controlling the arithmetic unit 30 in a predetermined order. Moreover, the display data read out from the display memory 13 by the graphic processing apparatus is converted into video signals by a display converter 40 so that this data is displayed by a display unit 50.

The aforementioned arithmetic unit 30 to be controlled by the control unit 20 is designed to sequentially compute both the addresses of the display memory 13 and the picture element addresses which designate the picture element positions in the one-word display data in the display memory 13; to read out the one-word display data in the display memory 13 from the address data of the display memory 13 in the picture element addresses computed; to logically compute only the bits of predetermined picture elements of the display data thus read out with the data for designating the plural bit positions corresponding to the designated picture element positions located by decoding that display data on the basis of the picture element position designating data of the picture element addresses; and to write the logically computed result again in the aforementioned display memory 13.

Incidentally indicated at numeral 60 is an external computer, and the graphic processing apparatus is operated in accordance with control data CDT such as instructions or parameters transmitted from the external computer 60.

Figure 2:
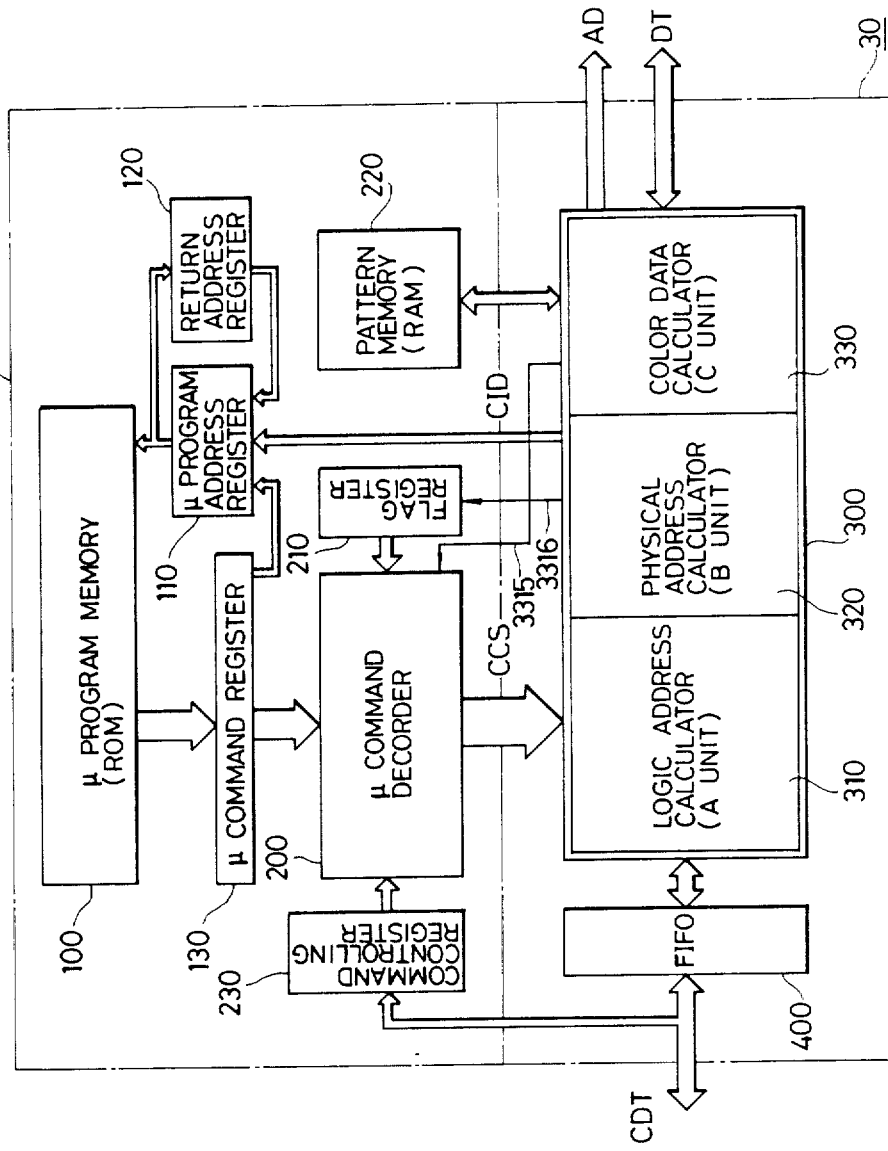
FIG. 2 is a block diagram showing a graphic processing apparatus according to the present invention.

FIG. 2 is a block diagram showing an embodiment of the graphic processing apparatus according to the present invention.

As shown, the control unit 20 is constructed of a micro program memory 100, a micro program address register 110, a return address register 120, a micro instruction register 130, a micro instruction decoder 200, a flag register 210, a pattern memory 220, and an instruction control register 230.

On the other hand, the arithmetic unit 30 is constructed of an arithmetic control unit 300 and an FIFO (i.e., First-In and First-Out) memory 400. The arithmetic control unit 300 is constructed of a logical address arithmetic unit (i.e., an A unit) 310, a physical address arithmetic unit (i.e., a B unit) 320, and a color data arithmetic unit (i.e., a C unit) 330.

In the arithmetic control unit 300, the A unit 310 computes where the drawing point is located in a frame mainly in accordance with a drawing algorithm; the B unit 320 computes the addresses necessary for the display memory; and the C unit 330 computes color data to be written in the display memory.

Figure 3:
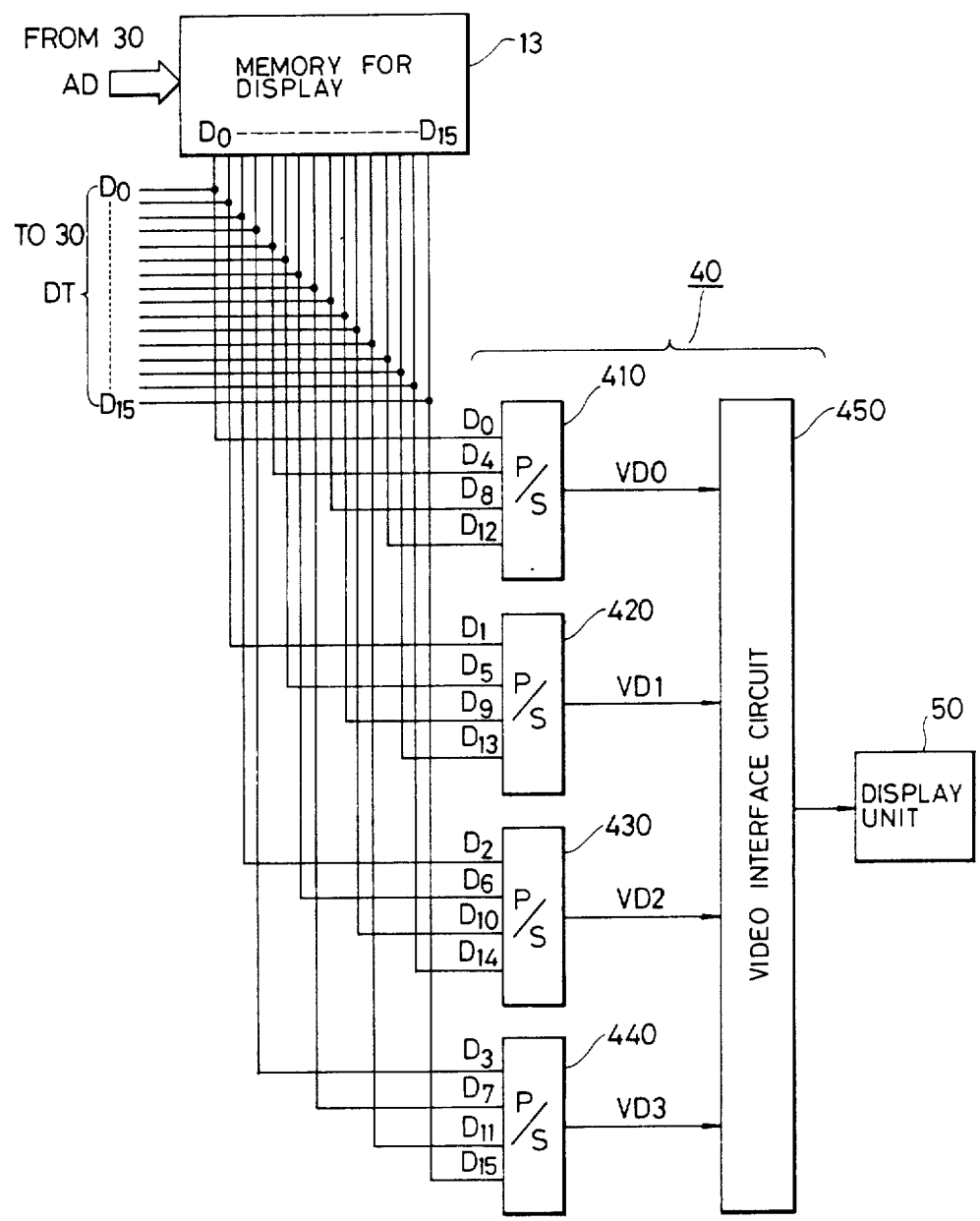
FIG. 3 is a diagram for explaining the case in which one picture element is displayed by four bits.

FIG. 3 shows an example of the construction of the display unit for displaying one picture element by four bits. The display data designated by the graphic processing apparatus of FIG. 2 is displayed in the display unit 50.

As shown in FIG. 3, the data $D_0$, $D_4$, $D_8$ and $D_{12}$ of display data DT read out from the display memory 13 on the basis of an address AD instruction from the graphic processing apparatus (shown in FIG. 2) are fed to a parallel-series converter 410 of four bits in the display converter 40. A video signal $VD_0$ is generated from that converter 410. Likewise, the data $D_1$, $D_5$, $D_9$ and $D_{13}$ of the display data DT are fed to a parallel-series converter 420 in the display converter 40, from which a video signal $VD_1$ is generated. The data $D_2$, $D_6$, $D_{10}$ and $D_{14}$ of the display data DT are fed to a parallel-series converter 430 in the display converter 40, from which a video signal $VD_2$ is generated. The data $D_3$, $D_7$, $D_{11}$ and $D_{15}$ of the display data DT are fed to a parallel-series converter 440 in the display converter 40, from which a video signal $VD_3$ is generated. The video signals $VD_3$ to $VD_3$ are fed to a video interface circuit 450 so that they are displayed by the display unit 50 after they have been processed through a color change or a DA conversion.

Next, the respective units of the arithmetic control unit 300 will be described in the following in connection with their specific constructions.

Figure 4:
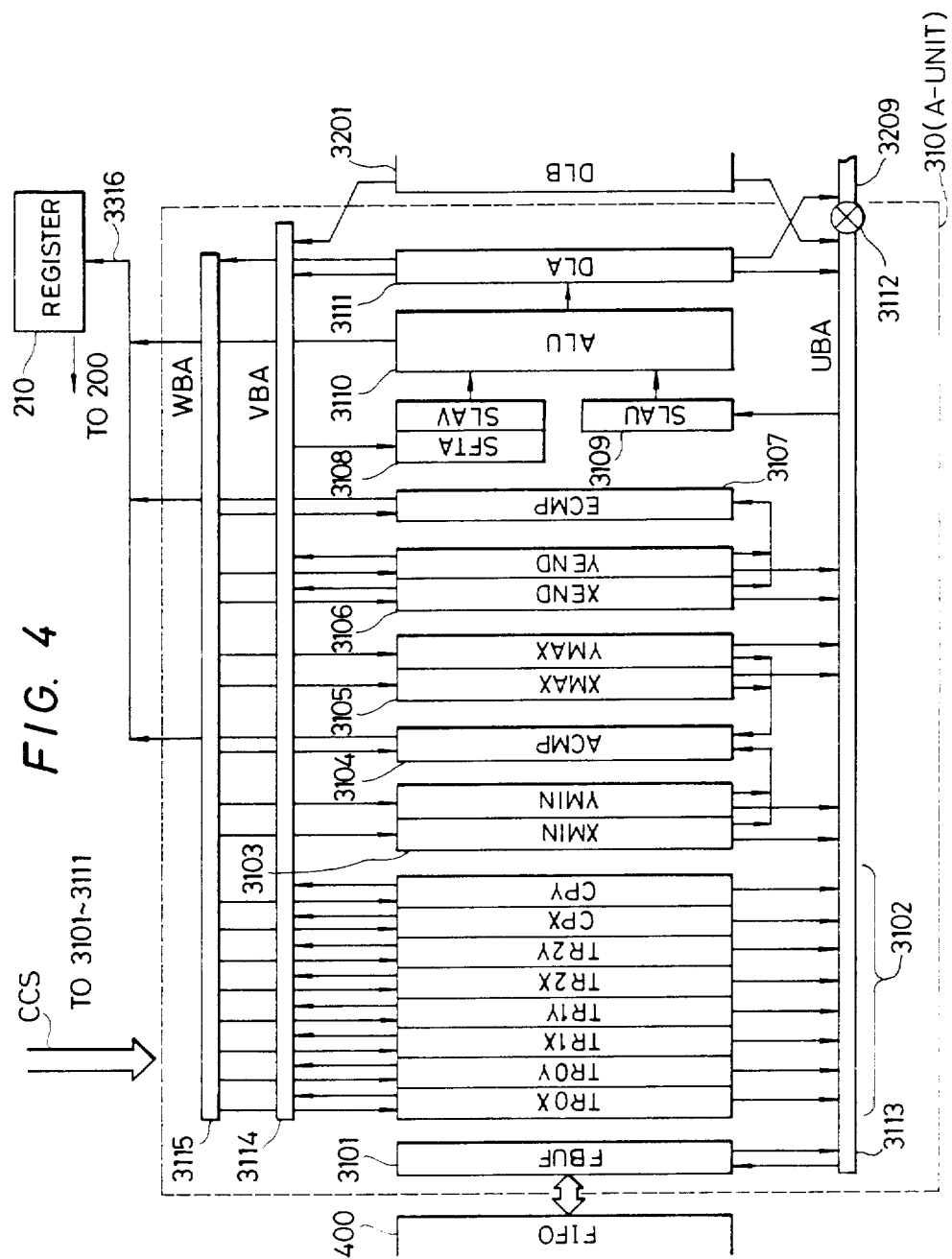
FIG. 4 is a diagram showing a specific example of the construction of a logical address arithmetic unit of FIG. 2.

FIG. 4 shows the logical address arithmetic unit 310 in detail. This arithmetic unit 310 is composed of an FIFO buffer (FBUF) 3101, a group of general purpose registers (TR0X, TR0Y, TR1X, TR1Y, TR2X and TR2Y) 3102, region administering registers (XMIN and YMIN) 3103 and (XMAX and YMAX) 3105, a region judging comparator (ACMP) 3104, ending point registers (XEND and YEND) 3106, an end judging comparator (ECMP) 3107, source latches (SFTA and SLAV) 3108 and (SLAU) 3109, an arithmetic logical unit (ALU) 3110, a destination latch (DLA) 3111, a bus switch 3112, read buses (UBA and VBA) 3113 and 3114, and a write bus (WBA) 3115.

Figure 5:
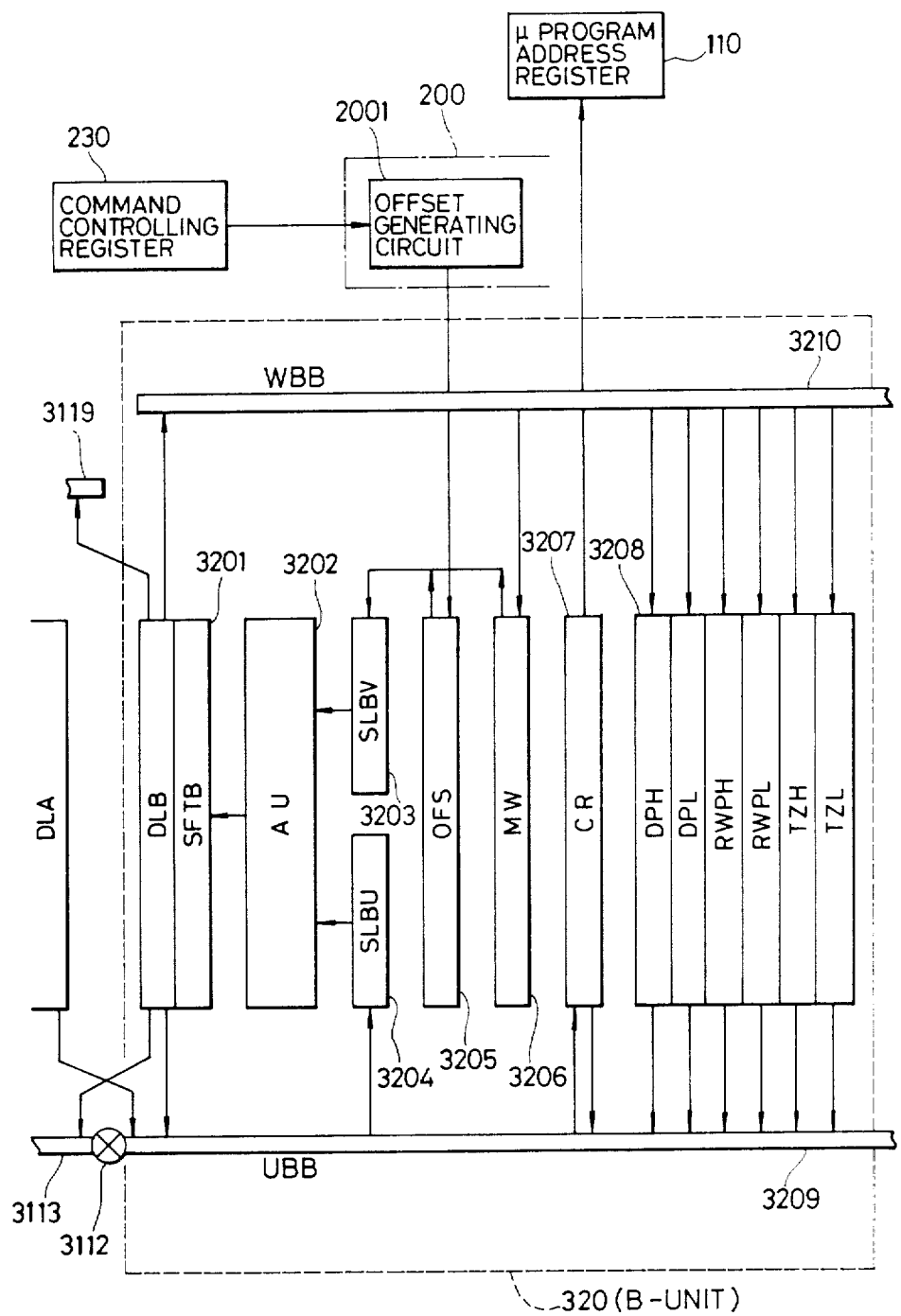
FIG. 5 is a diagram showing a specific example of the construction of a physical address arithmetic unit of FIG. 2.

On the other hand, FIG. 5 is a diagram showing the physical address arithmetic unit 320 or the B unit in detail. This arithmetic unit 320 is composed of destination latches (DLB and SFTB) 3201, an arithmetic unit (AU) 3202, source latches (SLBV) 3203 and (SLBU) 3204, an offset register (OFS) 3205, a frame width register (MW) 3206, a command register (CR) 3207, a group of general purpose registers (DPL, DPH, RWPH, RWPL, T2H and T2L) 3208, a read bus (UBB) 3209, and a write bus (WBB) 3201. Incidentally, the general purpose register group 3208 is composed of present address registers (DPH and DPL) of a picture element unit command, address registers (RWPH and RWPL) of a word unit command, and working registers (T2H and T2L).

Figure 6:
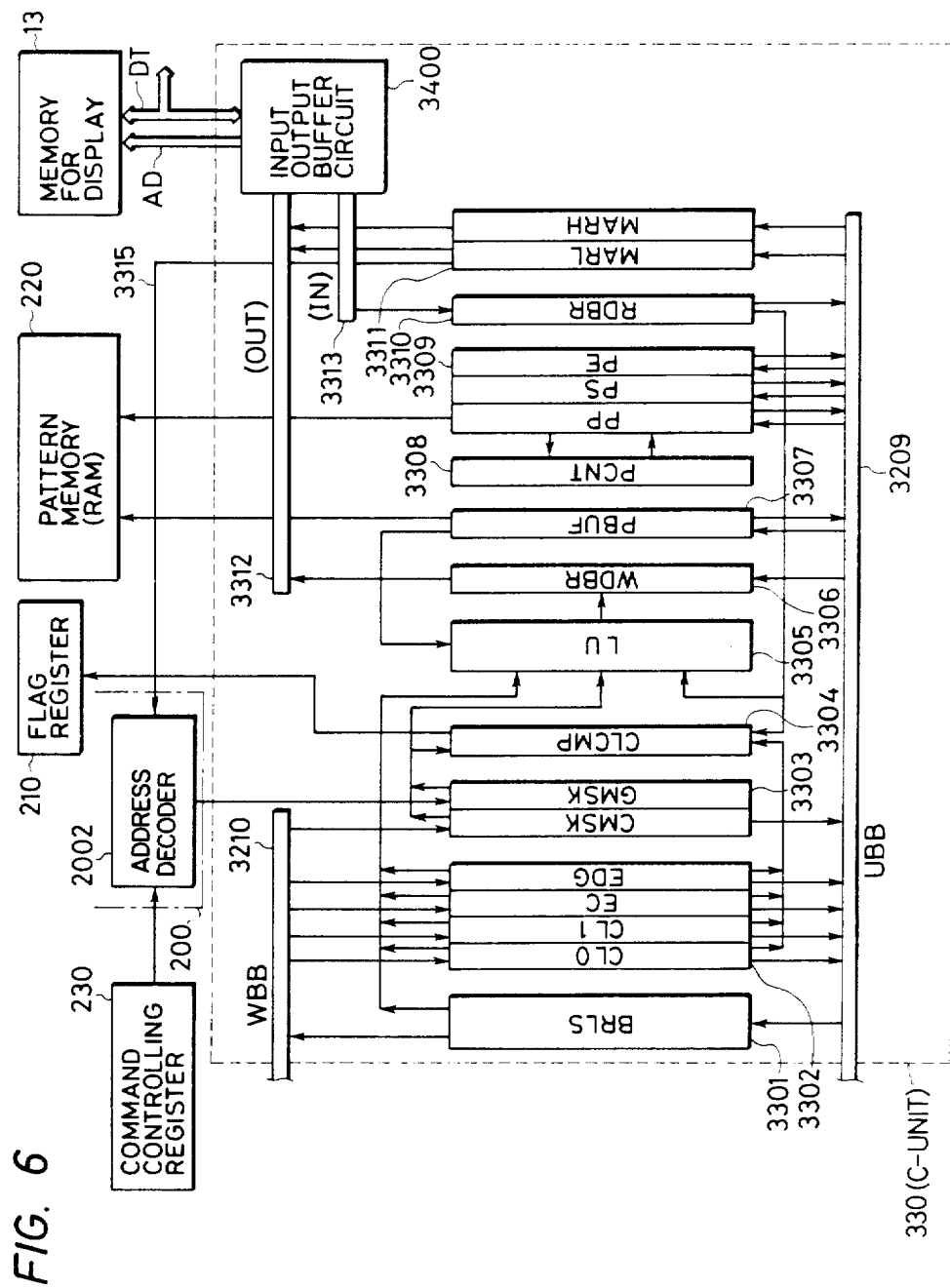
FIG. 6 is a diagram showing a specific example of the construction of a color data arithmetic unit of FIG. 2.

On the other hand, FIG. 6 is a detailed diagram showing the color arithmetic unit or the C unit. This C unit is composed of a barrel shifter (BRLS) 3301, color registers (CL0, CL1, EC and EDG) 3302, a color comparator (CLCMP) 3304, a logical unit (LU) 3305, a write data buffer (WDBR) 3306, a pattern RAM buffer (PBUF) 3307, a pattern counter (PCNT) 3308, pattern control registers (PP, PS and PE) 3309, a read data buffer (RDBR) 3310, memory address registers (MARL and MARH) 3311, a memory output bus 3312, a memory input bus 3313, and an input/output buffer 3400. Incidentally, a mask register 3303 is composed of a register (CMSK) and a register (GMSK).

Next, the operations of the embodiment having the construction thus far described will be described in the following. At first, the basic operations of the respective elements will be described. The display control data CDT shown in FIGS. 1 and 2 is written in the memory (FIFO) 400 on one hand and in the instruction control register 230 on the other hand in accordance with the instructions or parameters which are fed to the central processing unit from other units.

The instruction control register 230 stores a variety of graphic bit modes so that one of the five picture element modes can be selected according to the present embodiment, as will be described hereinafter. This selection can be conducted in accordance with the data CDT used.

The memory 400 is the so-called "First-In and First-Out" memory, and the instructions stored in the memory 400 are read out by the arithmetic control unit 300 and stored in the register 3101 in the arithmetic control unit 300. Moreover, a portion CID of the instruction data is transferred to the address register 110.

This address register 110 designates the address of the micro program memory 100, and this address is renewed in synchronism with a clock. In accordance with the address outputted from said address register 110, the micro instruction shown in FIG. 7 is read out from the micro program memory 100. The instruction read out from the memory 100 is composed of forty eight bits, as shown in FIG. 7, and about zero to seven control modes can be selected. Moreover, said instruction is stored temporarily in the register 130 and is fed through the decoder 200, which is made operative in accordance with the mode selected by the instruction control register 230, to generate a predetermined control signal CCS thereby to control the respective parts of the arithmetic control unit 300. Here, the functions of the respective fields of the micro instructions of FIG. 7 will be described in the following.

In FIG. 7, reference letters "RU" indicate an instruction for designating the register to be connected with the UBA bus 3113. Letters "RV" indicate an instruction for designating the register to be connected with the VBA bus 3114. Letters "RW" indicate an instruction for designating the register to be written with the data on the WBA bus 3115. Letters "FUNCA" indicate an instruction for designating the arithmetic operation of the arithmetic logical unit 3110 of the A unit. Letters "SFT" indicate an instruction for designating the shift mode of a shifter (SFTA) added to the source latch 3108. Letters "ADF-L" indicate an instruction for designating the lower four bits of a subsequent address to be returned to the micro program address register 110. Letters "AC" indicate an instruction for controlling a subsequent address of the micro instruction. Letters "ADF-H" indicate an instruction for designating the higher six bits of a subsequent address to be returned to the micro program address register 110. Moreover, those upper six bits of the address cannot be renewed in response of the respective micro instructions of about four to seven control modes. Letters "FUNCB" indicate an instruction for designating the arithmetic mode of the arithmetic unit 3202 of the B unit. Letters "ECD" indicate an instruction for designating the arithmetic executing conditions. Letters "BCD" indicate an instruction for designating branching conditions. Letters "FLAG" indicate an instruction for designating the reflections of the flags upon the flag register 210. Letter "V" indicates an instruction for designating whether or not the accessibility to the display memory 13 is to be tested. Letters "FIFO" indicate an instruction for controlling the read and the write operation s for the FIFO 400. Letters "LITERAL" indicate an instruction for designating literal data of eight bits. Letters "LC" indicate an instruction for designating the generation mode of the literal data. Letters "FF" indicate an instruction for controlling the setting and resetting of a special flip-flop of each portion. Letter "S" indicates an instruction for designating selection of code flags. Letters "MC" indicate an instruction for controlling the read and write of the display memory 13. Letters "DR" indicate an instruction for controlling sanning of a pattern RAM. Letters "BC" indicate an instruction for controlling the input path to the arithmetic unit 3202 of the B unit. Letters "RB" indicate an instruction for selecting the read and write registers of the B unit.

The micro instructions represent the aforementioned instructions, by which the control unit 20 controls the arithmetic unit 30.

Incidentally, the return address register 120 stores the return address of a subroutine. The flag register 210 stores a variety of condition flags. The pattern memory 220 stores the fundamental patterns to be used for the graphic processings. Next, the bit layout of the respective data to be used in the present embodiment will be described in the following.

First of all, the description is directed to the graphic modes.

In the present embodiment, five kinds of different operation modes can be selected in accordance with the designations of a graphic bit mode (GBM) stored in the instruction control register 230.

FIGS. 8(a) to (e) show the bit structures of one word of the display memory in the respective modes.

(a) Mode of one bit per picture element (GBM="000"):

This is a mode which is used in case one picture element is expressed by one bit, as in a dichromatic picture. The display memory has its one word stored with data of a sequence of sixteen picture elements.

(b) Mode of two bits per picture element (GBM="001"):

This mode is used in case one picture element is expressed by two bits so that it can be used for display of four colors or gradations. As a result, the display memory 13 can have its one word stored with data of a sequence of eight picture elements.

(c) Mode of four bits per picture element (GBM="010"):

This mode is used in case one picture element is expressed by four bits. The display memory can have its one word stored with data of a sequence of four picture elements.

(d) Mode of eight bits per picture element (GBM="011"):

This mode is used in case one picture element is expressed by eight bits. The display memory can have its word stored with data of two picture elements.

(e) Mode of sixteen bits per picture element (GBM="100"):

This mode is used in case one picture element is expressed by sixteen bits. The display memory has its one word corresponding to the data of one picture element.

FIG. 8(f) shows an example of the instruction control register 230.

Figure 8:
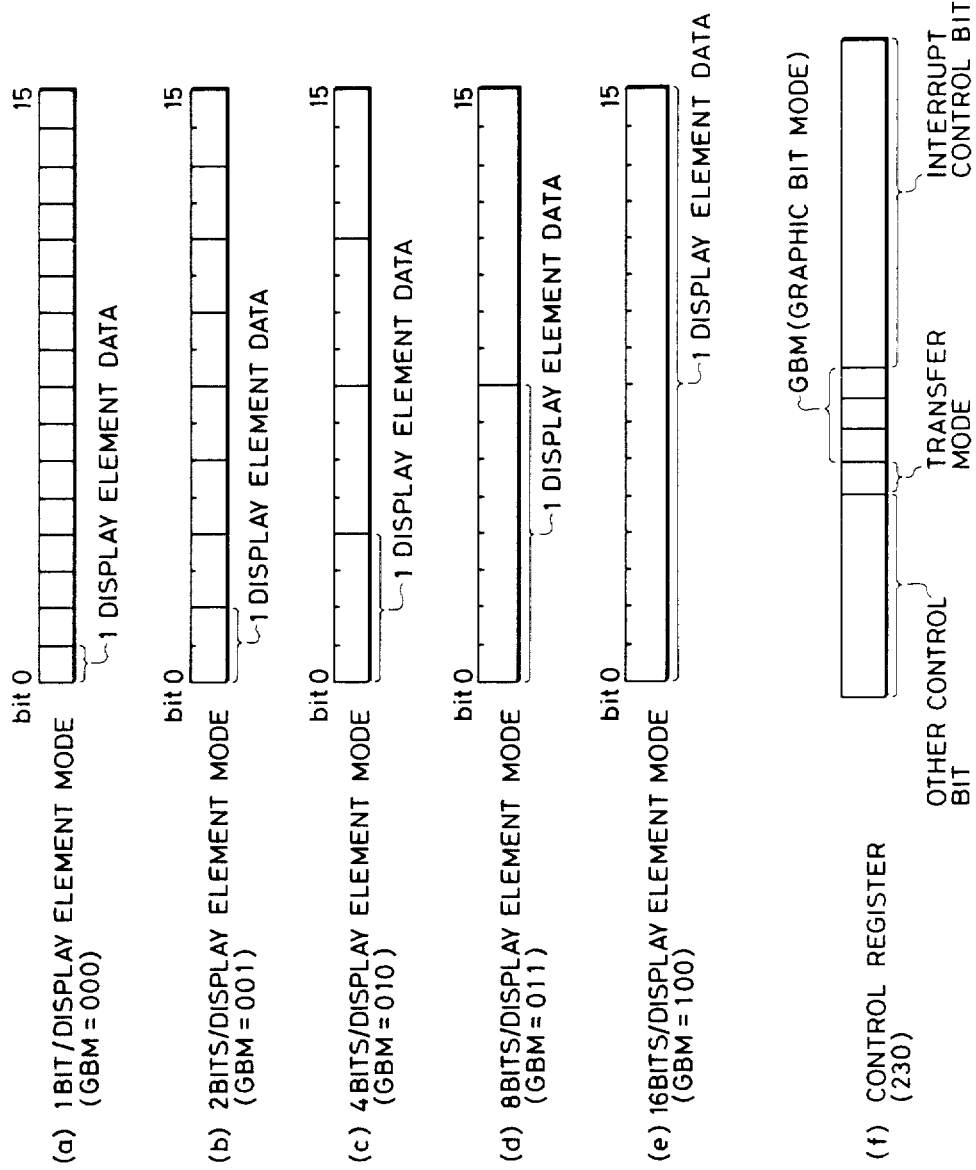
FIG. 8 a–f are diagrams for explaining the bit structures of a display memory in respective modes.
Figure 10:
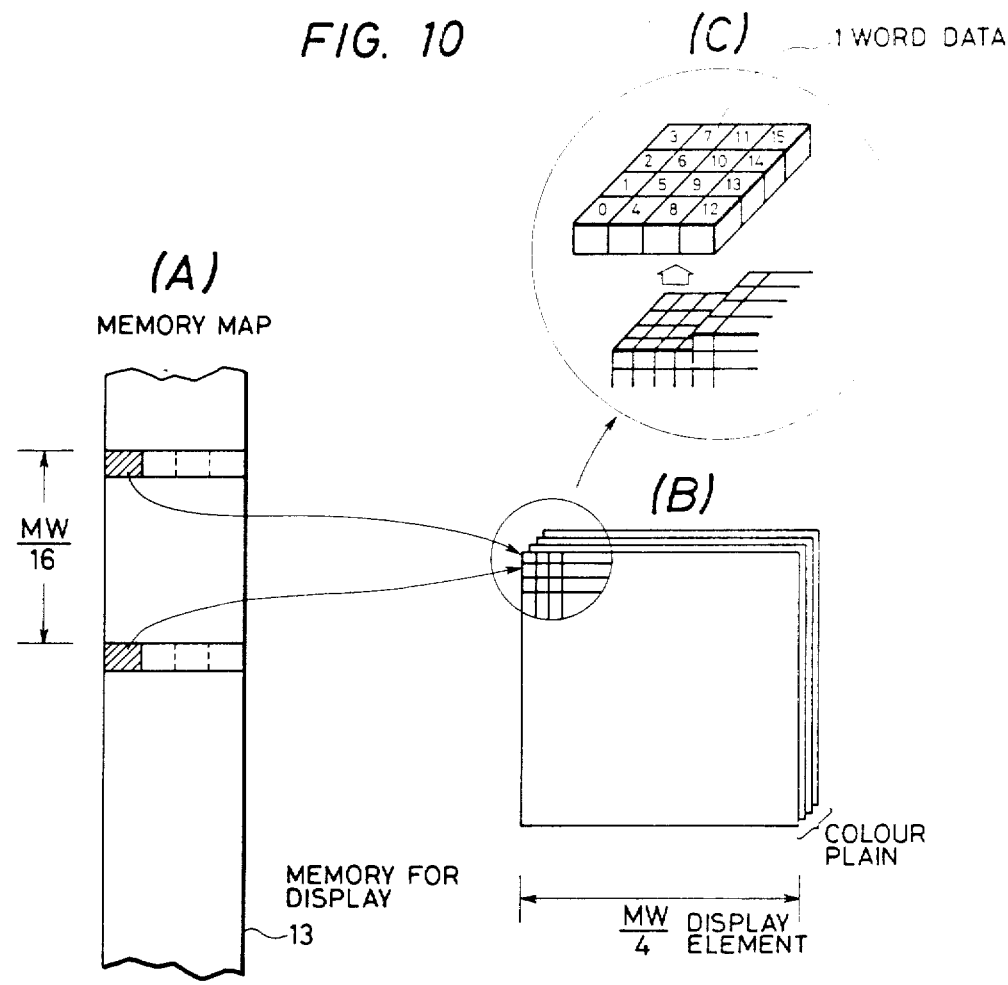
FIG. 10 is a diagram for explaining the special arrangement of the display memory in a mode of four bits per picture element.

FIG. 9 explains the picture element addresses corresponding to the respective modes of FIG. 8. The register 3208 of the physical address arithmetic unit administers the bit address (i.e., the physical address) WAD to which the lower four bits of the memory address are added. The data WAD of the lower four bits are used to designate the picture element position in one word and made operative in accordance with the respective bits per picture element mode. A mark "*" appearing in FIG. 9 denotes the bits which have no relationship with the arithmetic operation.

Next, the following description is directed to the monitoring operations of the drawing regions which are attained in the circuit thus constructed.

Figure 11:
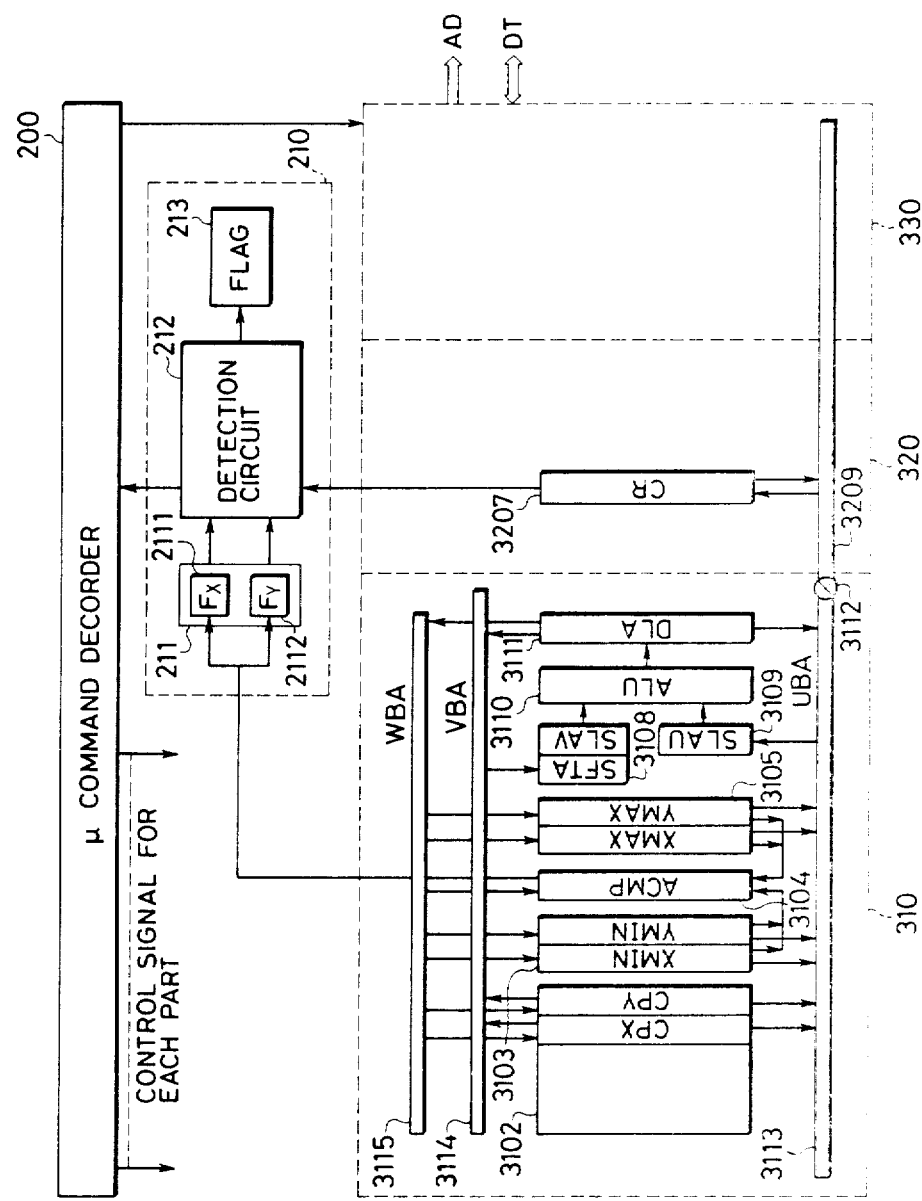
FIG. 11 is a diagram showing the constructions of portions relating especially to monitoring of graphic regions of FIGS. 4 to 6.

FIG. 11 shows the circuit portion relating especially to the monitoring of the drawing regions of FIGS. 4 to 6. As the major units of the present embodiment, there are shown the micro instruction decoder 200 for generating control signals for the respective portions in the processing apparatus, the flag register 210, the logical address arithmetic unit 310, the physical address arithmetic unit 320, and the color data arithmetic unit 330.

The logical address arithmetic unit 310 has built therein: the general purpose registers 3102 composed of the drawing point corrdinate registers (CPX and CPY) which store the coordinate values of the drawing point, and other temporary storage registers; the arithmetic logical units 3110 for conducting renewal of the drawing point coordinates and other operations; the region administration registers 3103 and 3105 which store the coordinate value data defining the drawing region; and the region judging comparator (ACMP) 3104 made of a window comparator, for example, for comparing the data, which is outputted from the arithmetic logical unit 3110 through the destination latch 3111 onto the write bus (WBA) 3115, and the contents of the region administering registers 3103 and 3105 to output whether or not the drawing point coordinate values are within the predetermined drawing region. On the other hand, the flag register 210 has built therein: a temporary memory flag 211 for reflecting the compared and judged result at the region judging comparator 3104; a drawing region detecting circuit 212 for detecting the drawing region on the basis of the content of the temporary memory flag 211 to perform a variety of controls such as the clipping processing; and a detecting flag 213 for reflecting the detected result of the drawing region detecting circuit 212. Here, this drawing region detecting circuit 212 conducts a variety of detecting processings in accordance with the drawing region detecting modes which are stored in the command register 3207, and will be described in detail hereinafter. The drawing point coordinates are administered by two registers CPX and CPY for storing the X- and Y-axis coordinate values of a drawing point in a two-dimensional space, respectively. The drawing region administering registers 3103 and 3105 are composed of four registers XMIN and YMIN registers for storing the respective minimums of the X- and Y-axis coordinates and XMAX and YMAX registers for storing the respective maximums of the X-axis and Y-axis coordinates so as to define a two-dimensional rectangular region as the predetermined drawing region. On the other hand, the temporary memory flag 211 is composed of an X flag (F$_X$) 2111 and a Y flag (F$_Y$) 2112. Incidentally, in the present embodiment, the data is inputted from the write bus (WBA) 3115 to the comparator 3104. Despite of this fact, however, the construction may be modified such that the data is inputted directly from the drawing point coordinate registers CPX and CPY. On the other hand, all the blocks thus constructed are made in a single LSI.

Now, with the construction described above, when either of the X- or Y-axis coordinate value stored in the CPX or CPY register of the general purpose registers 3102 is renewed by the arithmetic logical unit 3110, this arithmetic result is inputted through the destination latch 3111 and the write bus (WBA) 3115 to, the region judging comparator 3104 composed of a window comparator or the like so that it is compared with the content stored in the drawing region administering registers 3103 and 3105, until the compared result is reflected upon the temporary storage flag 211. When the arithmetic unit 3110 renews the X-axis coordinate, more specifically, the comparator 3104 compares the renewed result x with the minimum XMIN and maximum XMAX of the X-axis coordinate selected from the drawing region administrating registers 3103 and 3105 thereby to judge whether or not the following equation is satisfied:

$$XMIN \leq x \leq XMAX \tag{1}$$

Moreover, this compared result is registered and reflected on an X flag 2111 selected from the temporary memory flag 21. When the arithmetic unit 3110 renews the Y-axis coordinate value, on the other hand, the comparator 3104 compares the renewed result y with the minimum YMIN and maximum YMAX of the Y-axis coordinate value selected from the drawing region administering registers 3103 and 3105 thereby to judge whether or not the following equation is satisfied:

$$YMIN \leq y \leq YMAX \tag{2}$$

Moreover, this compared result is registered and reflected upon a Y flag 2112. Moreover, the contents of the X flag 2111 and the Y flag 2112 are inputted to the drawing region detecting circuit 212 so that the detecting circuit 212 sets and resets the detection flag 213 on the basis of those contents in accordance with the drawing region detecting mode stored in the command register 3207 thereby to reflect the detected result and to control the color data arithmetic unit 330 through the micro instruction decoder 200, thus conducting a variety of controls such as the clipping processing. Incidentally, in the present embodiment, the arithmetic unit 3110 and the comparator 3104 belong to one system and are switched in a time-sharing manner, as has been described above, so that they are commonly used for renewing the X- and Y-axis coordinate values and for conducting the comparisons of the equations (1) and (2). However, the arithmetic unit 3110 and the comparator 3104 may be constructed to belong especially to two systems. In this case, the parallel arithmetic can be made to speed up the renewals and comparisons of the X- and Y-axis coordinate values.

Table 1 enumerates the various drawing region detecting modes of FIG. 11 and their contents in summary. In Table 1, the respective drawing region detecting modes (AREA) are selectively set in accordance with the data of three bits, which are stored in the command register 3207, and have the contents (or summaries) such as continuations of the drawing and coordinate arithmetic inside and outside of the drawing region (or the defined region) or the settings of the detection flags.

Figure 12A:
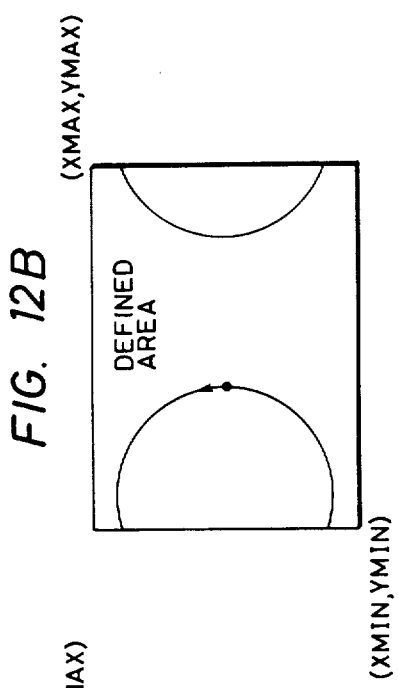
FIGS. 12(a) and (b) and FIGS. 13 to 18 are diagrams exemplifying the graphic processings in the respective modes.
Figure 12B:
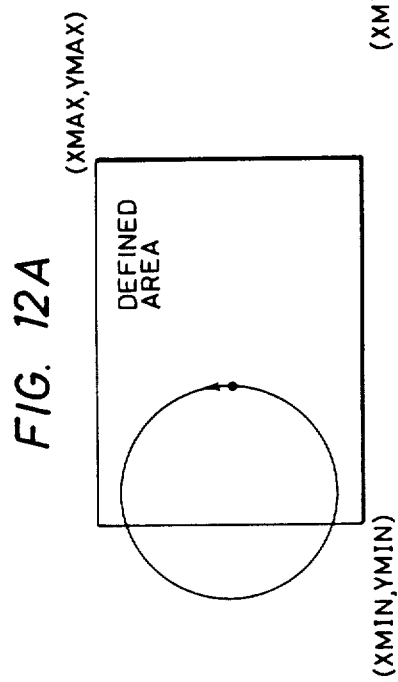

The drawing processings and operations containing the various clipping processings of FIG. 11 in the respective drawing region detection modes will be described with reference to Table 1 and FIGS. 12(a) and (b), FIG. 13, FIG. 14, FIG. 15, FIG. 16, FIG. 17 and FIG. 18. First of all, FIGS. 12(a) and (b) are diagrams for explaining the drawing for the first mode AREA="000" or the fifth mode AREA= "100" of Table 1 in where the memory space does and does not exist outside of the drawing region (or the defined region). In FIGS. 12(a) and (b), in case the present mode is selected and designated from the content of the register 3207 to issue a circle drawing command so that the graphic data corresponding to the command is transferred to the display memory in the display unit by the control of the drawing region detecting circuit 212 to draw a circle, the judgements of the drawing regions (i.e., the defined regions XMIN, YMIN, XMAX and YMAX) are not conducted in the drawing operation. In case the memory space exists outside of the defined region of FIG. 12(a), too, the drawing operation is continuously executed inside and outside of the defined region (as shown in solid line). In case the memory space is not outside of the defined region of FIG. 12(b), the left and right, and the upper and lower portions of the frame merge into each other so that the drawing point having a smaller X-axis coordinate value than the XMIN appears at the right side of the frame and is drawn (as shown in solid line). In order to prohibit those phenomena, the following respective modes AREA="001", "010", "011" and so on become effective.

Figure 13:
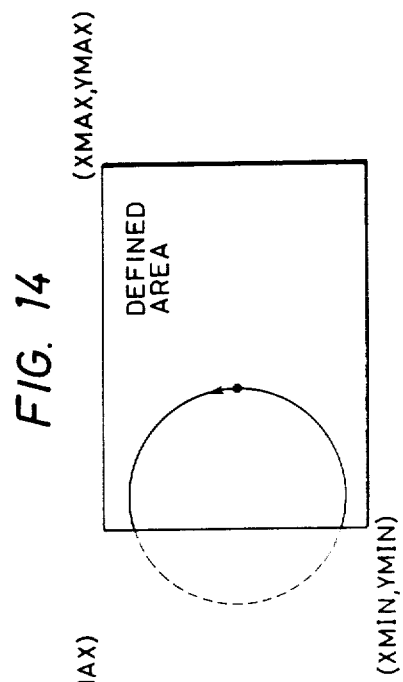

FIG. 13 is a diagram for explaining the drawing operation in the case of the second mode AREA="001" of Table 1. In FIG. 13, in case the present mode is designated to issue the circle drawing command thereby to draw a circle, this drawing operation is executed (as shown by solid arrow) in case the drawing point coordinate values are in the defined region when the drawing operation is to be started, and the drawing command is executed to the last (as shown in solid line) so long as the drawing point coordinate values are in the defined region. If the drawing point coordinate values come out of the defined region during the drawing operation, however, the region detection flag 213 is set, and the drawing command is ended to stop the coordinate arithmetic operation and the drawing operation (as shown in broken line). The present mode is effective to eliminate the spare arithmetic period outside of the drawing region. Especially in the straight line drawing case, the drawing command may be ended at the instant when the coordinate values come out of the defined region, because the coordinate values never come into the defined region once they come out of the region. By using these functions, the clipping processing of a segment can be easily realized in the following procedures. Specifically: the first procedure is to check whether or not the segment passes through the defined region; the second procedure is to find one arbitrary point on the section in the defined region in case the segment passes through the region; and the third procedure is to issue a command for drawing two straight lines in the mode AREA="001" from the found point to the two terminal points of the segment. Thus, the clipping operation of the straight line (or the segment) can be executed more easily than the algorithm of the terminal computations of the prior art.

Figure 14:
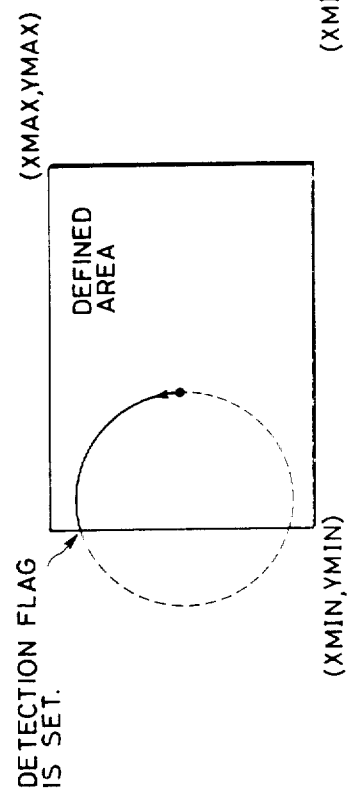
Figure 15:
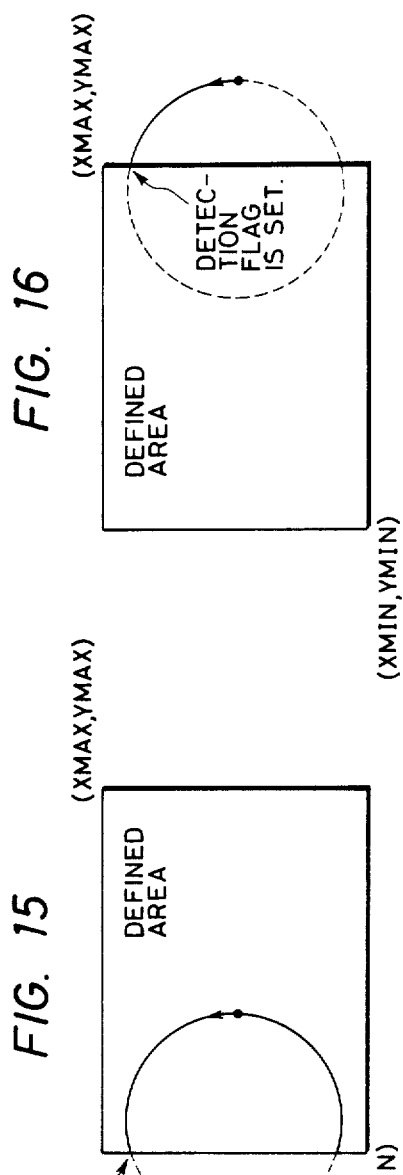

FIG. 14 is a diagram for explaining the drawing operation in the case of the third mode AREA="010" of Table 1. In FIG. 14, in case the present mode is designated to issue the circle drawing command thereby to draw the circle, the drawing operation is executed (as shown by solid arrow) in case the drawing point coordinate values are in the defined region at the drawing starting point, and the drawing operation is executed (as shown in solid line) so long as the coordinate values are in the defined region. When the drawing point coordinate values come out of the defined region, however, neither the region detection flag 213 is set nor is the drawing operation performed (as shown in broken line), but only the coordinate arithmetic operation is continued. At the instant when the drawing point coordinate values come again into the defined region, the drawing processing is executed again to effect the drawing operation (as shown in solid line). In the present mode, in case the drawing point coordinate values come out the defined region, as described above, the region detection flag 213 is not set either. On the other hand, FIG. 15 is a diagram for explaining the drawing operation in the case of the fourth mode AREA="011" of Table 1. In the present mode of FIG. 15, like the case of the mode AREA="010" of FIG. 14, the drawing operation is executed only when the drawing point coordinate values are within the defined region. Outside of the defined region, on the contrary, the region flag 213 is set, and only the coordinate arithmetic operation is continued without any drawing operation. In other words, the present mode is different from the mode of FIG. 14 only in that the region detection flag 213 is set (for detecting an error) in case the drawing point coordinate values leave the defined region.

Figure 16:
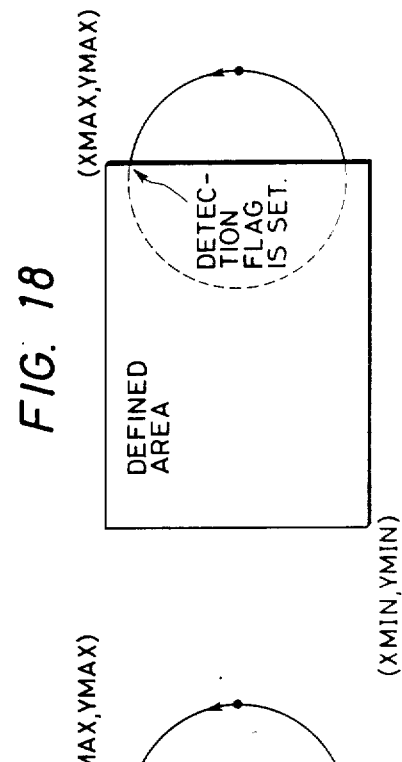

FIG. 16 is a diagram for explaining the drawing operation in the case of the sixth mode AREA="101" of Table 1. In the present mode of FIG. 16, in case the drawing point coordinate values are outside of the defined region at the starting time of the drawing operation, the drawing operation is executed (as shown by solid arrow), and the drawing command is executed to the last (as shown in solid line) so long as the coordinate values are outside of the defined region. When the coordinate values enters the defined region during the drawing operation, however, the region detection flag 213 is set, and the drawing command is terminated to stop the coordinate arithmetic operation and the drawing operation (as shown in broken line). The present mode can be effectively used in the picking function for selecting the graphic pattern on the frame. For this function, more specifically, the graphic detection may be detected by defining a fine region around a point designated on the frame and by testing whether or not a certain graphic drawing passes through that region.

Figure 17:
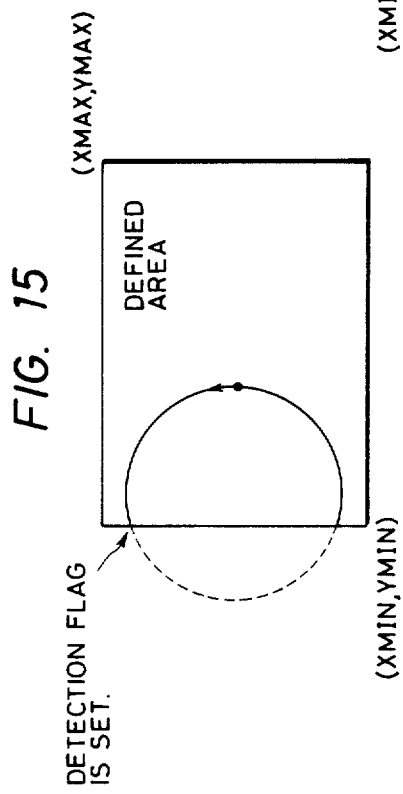
Figure 18:
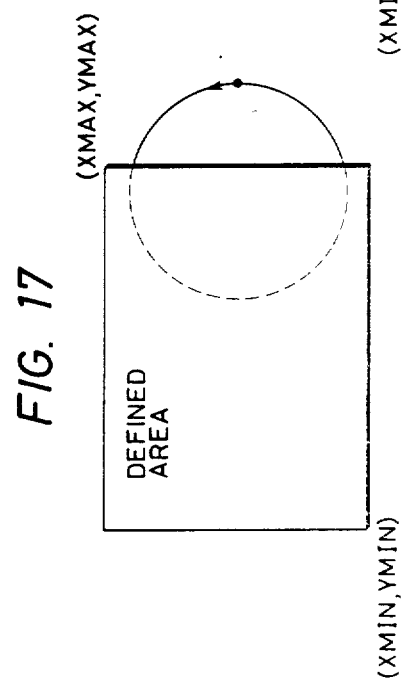

FIG. 17 is a diagram for explaining the drawing operation in the case of the seventh mode AREA="110" of Table 1. In the present mode of FIG. 17, the drawing operation is executed (as shown by solid arrow) in case the drawing point coordinate values are outside of the defined region at the starting time of the drawing operation, and is continued (as shown in solid line) so long as the coordinate values are outside of the defined region. When the drawing point coordinate values enter the defined region, however, the drawing operation is not conducted (as shown in broken line) without setting the region detection flag 213, but only the coordinate arithmetic operation is continued. At the instant when the drawing point coordinate values come again out of the defined region, the drawing processing is executed again to effect the drawing operation (as shown in solid line). On the other hand, FIG. 18 is a diagram for explaining the drawing operation in the case of the eighth mode AREA="111" of Table 1. In the present mode of FIG. 18, like the mode of FIG. 17, the drawing operation is executed only when the drawing point coordinate values are outside of the defined region. Inside of the defined region, the region flag 213 is set, and only the coordinate arithmetic operation is continued without any drawing operation. In the case of the mode AREA="110" of FIG. 17, more specifically, the region detection flag is not influenced. On the contrary, the case of the mode AREA="111" of FIG. 18 is different from the case of FIG. 17 only in that the region detection flag is set at the instant when the drawing point coordinate values come into the defined region. Those modes of FIGS. 17 and 18 are effectively used in case a predetermined region on the frame is defined as the drawing prohibiting region, e.g., in case the window display has already been made so that the drawing operation is intended to be conducted in the surrounding region without any breakage of said display.

Thus, according to the graphic processing apparatus of the present invention, the drawing region can be monitored at a high speed in real time despite the simple construction so that the processings which have been realized mainly by software in the prior art can be restricted to improve the performances.

Next, the graphic processing drawing method for processing the drawing arithmetic operation conditioned with the color or gradation data at a high speed and with a relatively simple construction will be described in the following. The graphic processing apparatus for that method comprises: means for comparing picture element data (as shown in FIG. 8) expressed by one or plural bits with other data; means for conducting an arithmetic operation between the prepared picture element data and the picture element data read from the outside; and means for controlling the arithmetic operation on the picture element data in accordance with the compared result.

Figure 19:
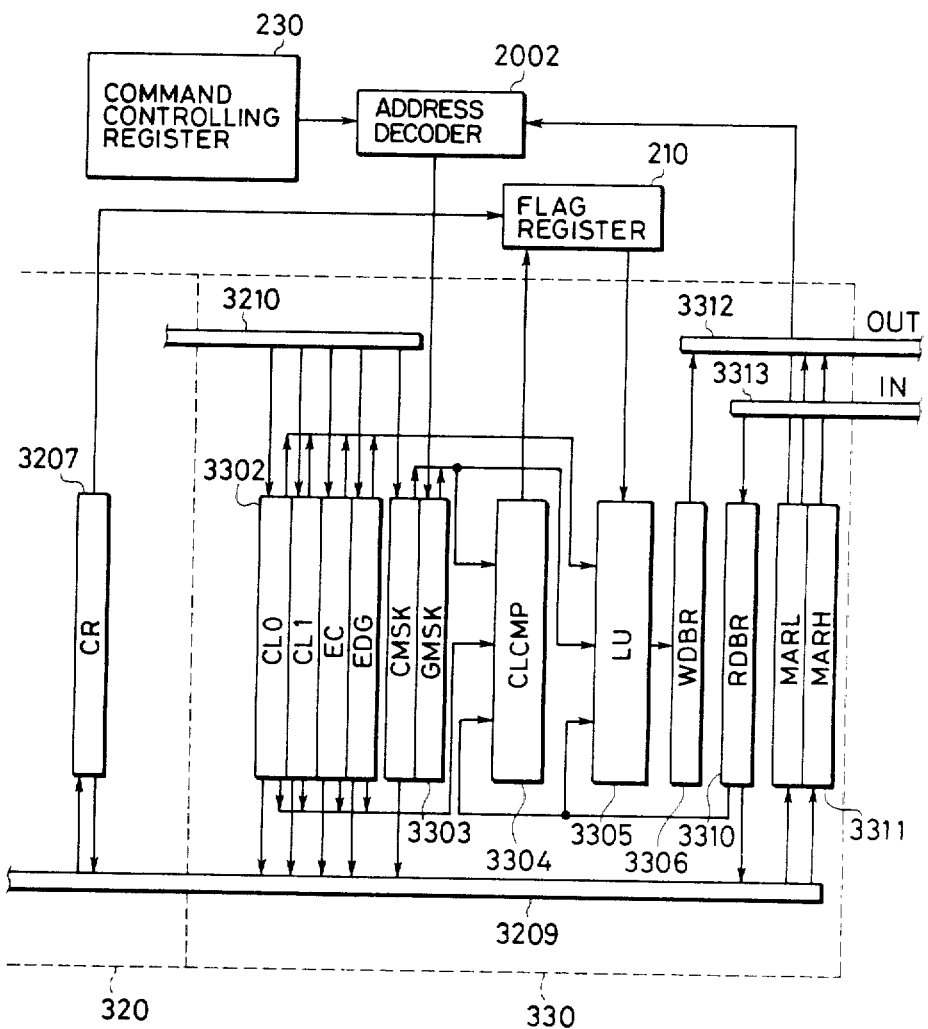
FIG. 19 is a diagram showing the construction of a conditioned graphic processing portion.

FIG. 19 shows the construction of such a portion of one embodiment of the present invention as it relates to the conditioned drawing operation and as is composed of the following elements. Of these elements, the color comparator 3304 and the flag register 210 form an important part according to the present invention.

(1) Color Comparator 3304:

On the basis of the mask data from the mask register 3303, the color comparator 3304 clips the data of one picture element for comparison from the respective data of the read data buffer 3310 and the color register 3302.

(2) Logical Arithmetic Unit 3305:

On the basis of the mask data from the mask register 3303, the logical arithmetic unit 3305 logically or arithmetically computes the data of one picture element between the data from the read data buffer 3310 and the color register 3302.

(3) Color Register 3302:

This color register 3302 is composed of a group of registers for storing a variety of color data such as drawing color data or comparison color data.

(4) Mask Register 3303:

This mask register 3303 is composed of a group of registers for storing either the mask data (GMSK) corresponding to the picture element data or the mask data (CMSK) which can be arbitrarily set from the central processing unit or another control unit.

(5) Read Data Buffer 3310:

This is a register for temporarily storing the data which is read out from the memory to be stored with the graphic data.

(6) Write Data Buffer 3306:

This is a register for temporarily storing the arithmetic result of the logical arithmetic unit 3305 and for outputting it to the memory to be stored with the graphic data.

(7) Address Decoder 2002 in One Word:

This address decoder 2002 generates mask data for clipping the data of one picture element in accordance with the number of bits to be assigned to the one picture element and outputs it to the mask register 3303.

(8) Flag Register 210:

This flag register 210 controls the logical arithmetic unit 3305 in accordance with the compared result from the color comparator 3304 and the arithmetic mode stored in the command register 3207.

The comparing and arithmetic processings of the picture element data, which are to be executed in the color data arithmetic unit 330, are conducted in accordance with the instructions from the central processing unit or other control units. A sequence of operations, in case the picture element data is to be compared and computed, are conducted, as follows:

The data of one word is read out from an external memory (although not shown) for storing the graphic data and is stored in the read data buffer 3310. The one-word data contains one or more picture element data. This data is sent to the color comparator 3304. At this time, from both the bit address data coming from the memory address register 3311 and indicating the picture element position in one word and the data coming from the instruction control register 230 and indicating the bit number indicating one picture element, the address decoder 2002 in one word generates the mask data and stores it in the mask register 3303. In accordance with the control signals, moreover, the comparison data is selected from the color register 3302 and sent to the color comparator 3304. On the basis of the mask data from the mask register 3303, the color comparator 330 compares the comparison data and the data from the read data buffer 3310. The compared result is outputted to the flag register 210. In the logical arithmetic unit 3305, the data of one picture element is subjected to mask processing for the drawing color data, which is outputted from the read data buffer 3310 and the color register 3302, on the basis of the mask data from the mask register 3303 and is computed. This arithmetic result is stored in the write data buffer 3306 and written in the memory which stores the original graphic data.

The embodiment of FIG. 19 has a function to conduct an efficient processing, even in case the data of one picture element is expressed by plural dots (e.g., in multiple colors or gradations), and can select five kinds of different operation modes in accordance with the set graphic bit mode stored in the instruction control register. These operations have already been described with reference to FIG. 9.

FIG. 20 shows the relationships between the mask data generated by an address decoder 2002 in one word and the bit addresses outputted from the memory address register 3311. For example, in case the four to seven bits of the picture element data are to be compared and computed, the bit address 4 (as shown in FIG. 20(b)) is generated in the lower four bits of the memory address register 3311. In this case, the mask data generated by the address decoder 2002 in one word is set at "1" only for the bits for comparing and computing the picture element data and at "0" for the other bits. In case the bit address is at "4", more specifically, the mask data of FIG. 20(b) is generated and stored in the mask register (GMSK) 3303.

Table 2 enumerates the arithmetic modes of the picture element data according to the embodiment of the present invention. The operation modes 0 to 3 of the picture element data are those not for comparisons but for the arithmetic operations of the picture element data, whereas the operation modes 4 to 7 are those for comparing the picture element data so that the execution of the picture element data arithmetic operation may be determined depending upon the compared result. These operation modes will be described in detail in the following:

(1) Operation Mode 0 (="000"):

In this mode, the arithmetic processing, in which the drawing color data of the selected color register 3302 is replaced by the data of one picture element of the drawing point, is executed by the logical arithmetic unit 3305.

(2) Operation Mode 1 (="001"):

Like the aforementioned operation mode 0, a logical "OR" is executed by the logical arithmetic unit 3305 between the color data from the color register 3302 and the data of one picture element of each data of the read data buffer 3310.

(3) Operation Mode 2 (="010"):

Like the operation mode 1, a logical "AND" is executed for the data of one picture element.

(4) Operation Mode 3 (="011"):

Like the operation mode 1, logical "EOR" is executed for the data of one picture element.

(5) Operation Mode 4 (="100"):

This is the mode for allowing only a predetermined color to be drawn. The comparison, is effected between the comparison color data of the selected color register 3302 and the data of one picture element from the read data buffer 3310. If the comparison picture element data from the color register 3302 and the data of one picture element of the drawing point from the read data buffer 3310 are resultantly identical, the replacing arithmetic processing for the drawing color data from the selected color register 3302 and the data from the read data buffer, i.e., the data of one picture element, is executed by the logical arithmetic unit 3305. If the compared result is not identical, the arithmetic processing of the picture element data is not conducted.

(6) Operation Mode 5 (="101"):

This is the mode for prohibiting a predetermined color to be drawn. If, like the aforementioned operation mode 4, the comparison of the data of one picture element is conducted by the color comparator 3304 so that the result is not identical, the picture element data arithmetic processing for replacing the selected drawing color data and one picture element of the drawing point of the data from the read data buffer 3310 is executed by the logical arithmetic unit 3305. In case the compared result by the picture element comparator is identical, the picture element data arithmetic processing is not conducted.

(7) Operation Mode 6 (="110"):

The comparison between the respective data of one picture element of both the drawing color data from the selected color register 3302 and the color data from the read data buffer 3310 is conducted by the color comparator 3304. So long as the comparison results indicate that the drawing color data has a larger value than the drawing point data from the read data buffer 3310, the arithmetic processing for replacing the data of one picture element of the drawing point from the read data buffer 3310 and the data of one picture element of the drawing color data from the color register 3302 is conducted by the logical arithmetic unit 3305. In case the comparison indicates that the drawing color data has a smaller value than the drawing point color data before execution of the drawing operation, the picture element data arithmetic processing is not executed. In other words, the larger color data is preferentially drawn.

(8) Operation Mode 7 (="111"):

The comparing arithmetic operation similar to that of the aforementioned operation mode 6 is conducted by the color comparator 3304. In case the comparison results indicate that the drawing color data from the color register 3302 has a smaller value than the color data from the read data buffer 3310 before execution of the drawing operation, the arithmetic for replacing the data of one picture processing for element of the drawing point by the data of one picture element of the drawing color data from the color register 3302 is executed by the logical arithmetic unit 3305. If the compared result is the aforementioned one, the arithmetic processing of the picture element data is not executed. In other words, the smaller color data is preferentially drawn.

Figure 21:
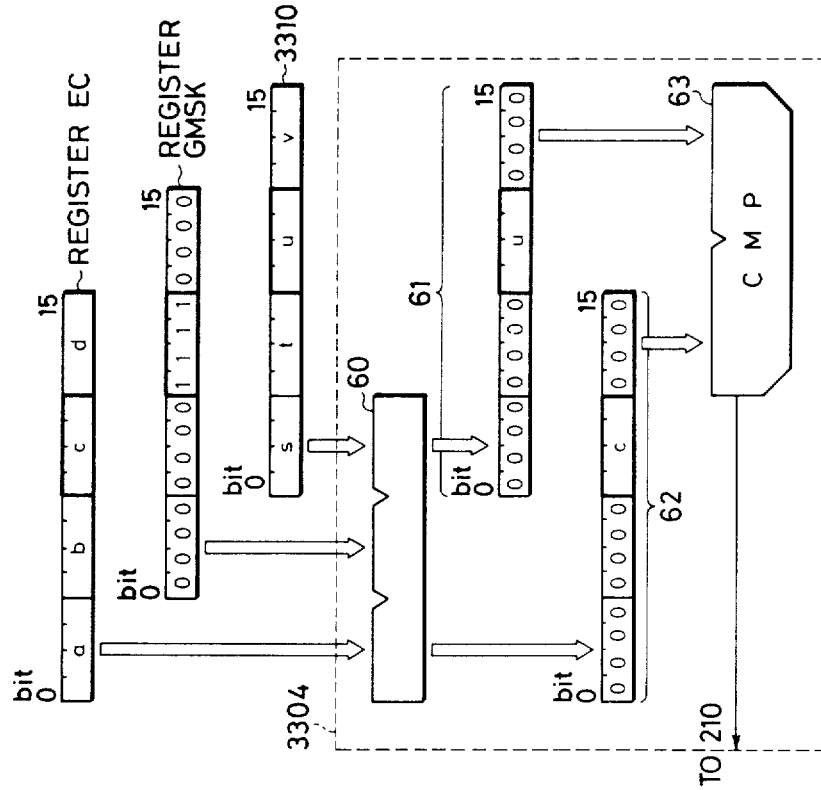
FIG. 21 is a diagram showing the comparison of picture element data by a color comparator.

FIG. 21 shows the comparison of the picture element data by the color comparator 3304 by taking up the bit address 8 in the mode of four bits per picture element as an example. The mask arithmetic processings of the comparison data from the three data—the comparison color data of the register (EC) of the color register 3302, the mask data of the register (GMSK) from the read data buffer 3310, and the color data of the registers (CL0 and CL1) from the read data buffer 3310—are conducted by the mask arithmetic unit 60. This mask arithmetic unit 60 clips the data of one picture element, which is expressed in one or plural bits for comparing the picture element data, with reference to the mask data (of the register GMSK). As a result, the comparison color data (of the register EC) is generated as the masked comparison color data 62, whereas the color data coming from the read data buffer 3310 before execution of the drawing operation is generated as masked drawing point data 61 before the drawing operation. A comparator 63 compares the magnitudes and the coincidence and non-coincidence of the masked comparison color data 62 and the masked drawing point data 61 and outputs the result to the flag register 210.

Figure 22:
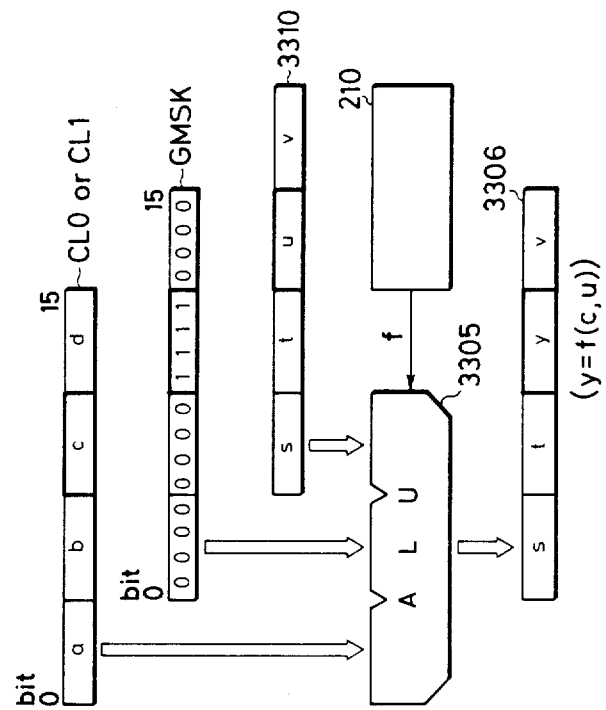
FIG. 22 is a diagram showing the arithmetic of the picture element data by a logical arithmetic unit.

FIG. 22 shows the picture element data arithmetic processing by the logical arithmetic unit 3305 by exemplifying the case of the bit address 8 in the mode of four bits per picture element.

The logical arithmetic unit 3305 conducts the picture element data arithmetic processing in accordance with the controls of the flag register 210 by using the three data—the drawing color data (CL0 or CL1) from the color register 3302, the mask data (GMSK) from the mask register 3303, and the data from the read data buffer 3310. The picture element data arithmetic processing is conducted on the basis of the mask data (GMSK) but requires no computation. For the bit "0" of the mask data, no arithmetic operation is executed, but the value of the read data buffer 3310 is outputted to the write-data buffer 3306. For the bit "1" of the mask data, the arithmetic operation between the data "c" of one picture element in the common bit positions of the drawing color data (CL0 and CL1) from the grouped color registers and the data "u" of one picture element similar to the data from the read data buffer 3310 is conducted, and the result "y" is outputted to the write data buffer 3306. The arithmetic operation to be executed here is conducted, as enumerated in Table 2, in accordance with the operation mode.

FIG. 23 shows an example in which the drawing processings of the operation modes 0 to 3 are executed by using the hardware construction of FIG. 19 shown as the embodiment of the present invention. FIGS. 23(c) to (f) show examples in which the drawing processings of the figure shown in FIG. 23(a) are executed in the respective operation modes for the image memory shown in FIG. 23(b) before execution of the drawing operation. FIG. 23(c) shows the result in which the picture element data arithmetic operation of replacement is executed in the operation mode 0. In other words, there is shown the result in which the drawing data of the drawing region is replaced by the drawing graphic data. Likewise: FIG. 23(d) shows the result of the AND operation in the operation mode 2; FIG. 23(e) shows the result of the OR operation in the operation mode 1; and FIG. 23(f) shows the result of the EOR operation in the operation mode 3.

FIG. 24 shows the result, in which the drawing processings in the operation modes 0 and 4 to 7 are executed by using the hardware construction of FIG. 1 showing the embodiment of the present invention. FIG. 24 shows the case in which a blue rectangle expressed in terms of the value "3" of the drawing color data is drawn sequentially for a black region expressed in terms of the value "0" of all the image data before execution of the drawing operation, in which a green rectangle expressed in terms of the value "1" of the drawing color data is to be drawn, and in which a red rectangle expressed in terms of the value "2" of the drawing color data is to be drawn. FIG. 24(a) shows the result in which the drawing operation is executed in the operation mode 0 enumerated in Table 2. In this mode, the red rectangle drawn finally is left on the uppermost face. FIG. 24(b) shows the result, in which the drawing operation is executed in the operation mode 4 enumerated in Table 2 by setting black expressed in terms of the value "0" of the color data. In this example, the drawing operation is executed for the same data as the comparison color by designating the same data as the background black for the comparison color. Here, none of the data to be drawn are consistent with the comparison color, the blue rectangle having been drawn at first is left on the uppermost face. FIG. 24(c) shows an example, in which the drawing operation is executed in the operation mode 5 by setting green expressed in terms of the value "1" of the color data as the comparison color data. This is the mode in which the drawing operation is executed only in case the comparison color data and the drawing point data are not identical. In case the first blue rectangle is to be drawn, therefore, the second blue rectangle is drawn as it is because the picture element data before the drawing operation of the drawing point is black or green. In case the third red rectangle is to be drawn, it is drawn only in the region excepting the green rectangle because the picture element data identical to those of green of the comparison color data is present. Likewise, FIG. 24(d) shows the result in which the respective rectangles are drawn in the operation mode 6. This is the mode in which the drawing operation is executed only in case the value of the picture element data to be drawn in the drawing point is larger than that of the drawing point picture element data before the drawing operation. As a result, the first blue rectangle of the drawing color data "3" is drawn because the color data before the drawing operation of the drawing point is at "0" so that the drawing color data is larger. When the second green rectangle of the drawing color data "1" is to be drawn, only the black region is drawn, but the blue rectangular region is not because only the region having a smaller value than the color data "1" is drawn. In case the third red rectangle of the drawing color data "2" is to be drawn, the blue region of the drawing point picture element data "3" before the drawing operation is not drawn, but only the remaining regions are drawn. As a result, the figure shown in FIG. 24(d) is attained. FIG. 24(e) shows the result in which the drawing operation is executed likewise in the operation mode 7. This is the mode in which the drawing operation is executed only when the picture element data to be drawn is smaller than the drawing point picture element data before the drawing operation. This mode results in no execution of the drawing operation because the color data to be drawn is at "1", "2" and "3" which are larger than the value "0" of the picture element data before the drawing operation.

As has been described in detail hereinbefore, according to the present embodiment, a variety of effects can be obtained, as follows. The later drawing is dominant in the usual drawing operation (in the operation mode 0), whereas various colors can be mixed in the operation modes 1 to 3. In the operation mode 4, the figure drawn at first can be preferentially displayed by designating a predetermined background color so that an effect contrary to that of the usual drawing operation can be attained. In the operation mode 5, the masking can be made to prevent important data from being erased because a predetermined color can be prohibited from being drawn. In the operation modes 6 and 7, a common result can be attained for different drawing orders because the operation is conducted in accordance with a predetermined preferential order. This function can effect a deep expression, if it is used, and can be applied to a movie processing if a portion of the graphic data is sequentially renewed.

FIG. 25 shows another embodiment in which the comparison is conducted for a partial field of one picture element. FIG. 25(a) shows the structure of the data of one picture element, which is composed of a display picture element data field to be displayed in the frame and a picture element display control field. The former display picture element data field display picture element data of sixteen colors by four bits. The latter picture element display control field comprises the coordinate values (or Z-axis coordinate) in the depthwise direction as the data belonging to the respective picture elements.

FIG. 25(b) shows the construction of an apparatus for generating mask data for comparing the picture elements for the partial field of one picture element. For the mask data coming from the address decoder 2002 in one word and indicating the region of one picture element, the AND arithmetic with the data coming from a field mask data register 80 and indicating the partial field of one picture element is conducted to prepare the mask data to be inputted to the color comparator 3304. On the basis of the mask data thus generated, as has been described with reference to FIG. 2, the picture element data comparison is executed only for the partial field to control the picture element data arithmetic.

FIG. 26 shows the system construction which makes the three-dimensional graphic processing possible by adopting the construction of the data of one picture element shown in FIG. 25(a) and by conducting the picture element data comparison shown in FIG. 25(b) to control the drawing processing. In other words, the hiding processing by the Z buffer algorithm can be conducted by expressing the data of one picture element in the composed field of the two fields, i.e., the display picture element field having the display data and the picture element display control field having the Z-axis coordinate value, and by comparing only the picture element display control field having the Z-axis coordinate value so that the drawing arithmetic may be effected only in case the Z-axis coordinate value is located in a position close to the viewer.

In this system described above, the graphic display system for the three-dimensional graphic processing is constructed by comparing the picture element data for the partial field of the picture element data in the graphic processing apparatus, by controlling the drawing processing, by controlling the display picture element data, by inputting the display picture element data to the display control circuit, and by displaying the same in the CRT.

According to the present embodiment, there can be attained an effect that the graphic drawing processing having various hiding processings or the like is made possible by dividing the data of one picture element into the display picture element field and the picture element display control field, and by comparing the picture element data only for said picture element display control field thereby to control the drawing processing.

Figure 27:
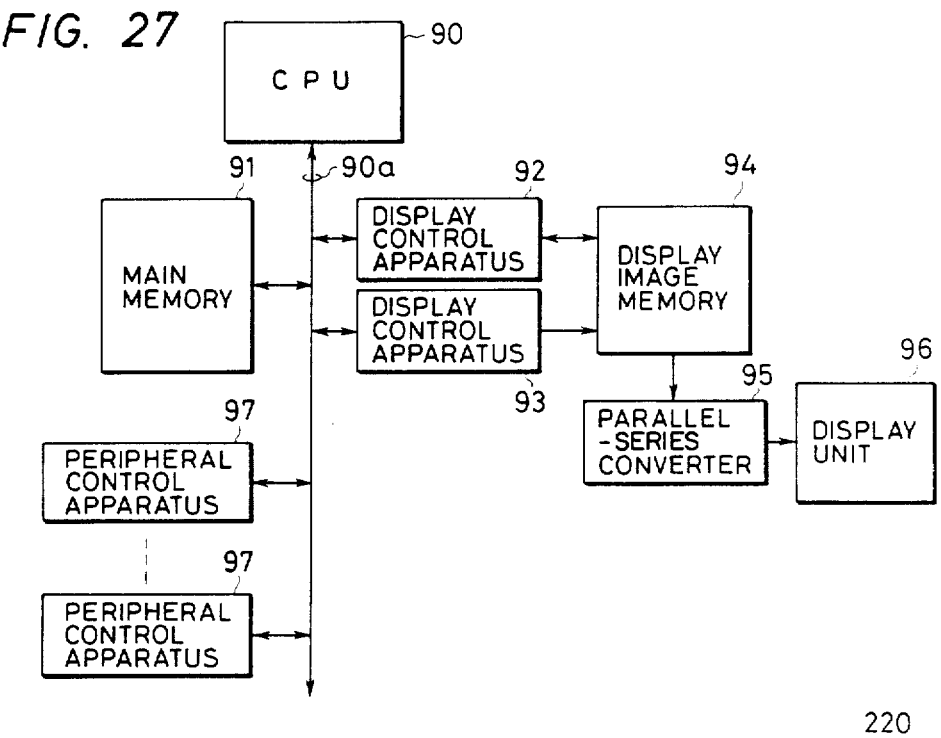
FIG. 27 is a block diagram showing the overall construction of a display system.

FIG. 27 shows the overall construction of the display system, to which the graphic processing system according to the present invention is applied as an applied example of the present invention. The display system is constructed of a central processing unit 90, a main memory 91, a graphic processing apparatus 92, a display control unit 93, an image memory 94, a parallel-series converter 95, a display unit 96, and other peripheral control units 97. Here, the graphic processing apparatus 92 and the image memory 94 form the portion relating to the present invention.

The central processing unit 90 is used to control the system in its entirety and to perform the controlling processing in accordance with the programs or data stored in the main memory. The main memory 91, the graphic processing apparatus 92, the display control unit 93 and the remaining peripheral control units 97 are connected with a bus 90a which in turn is connected to the central processing unit 90. Here, the peripheral control units 97 may be exemplified by a variety of input/output control units or auxiliary storage control units.

The image memory 94 is used to store the data corresponding to the respective picture elements on the frame of the display unit 96. The graphic processing apparatus 92 according to the present invention interprets the commands to be transferred through the bus 90a and generates a variety of figures on the image memory 94. On the other hand, the display control unit 93 controls generations of various synchronous signals and the reading operations of the image memory 94 so that the data on the image memory 94 may be sequentially read out and displayed in the display control unit 96. Since the data is usually read out in parallel from the image memory 94, the parallel-series converter 95 is used to convert the data read out into series video signals.

In the present embodiment, different results are obtained in accordance with the various processing modes when the graphic data is to be made on the image memory 94. Moreover, the color conditions can be easily changed because the processing modes and the color designating parameters can be controlled independently of the generations of the respective picture element data. In this applied example, therefore, the burden to be loaded upon the central processing unit 90 for changing the color conditions can be lightened to a remarkable extent.

Next, the pattern control to be used in an arbitrary size by using the fundamental ones of the line and design patterns in the case of the line drawing operation in the graphic processing field will be described in the following.

Figure 28:
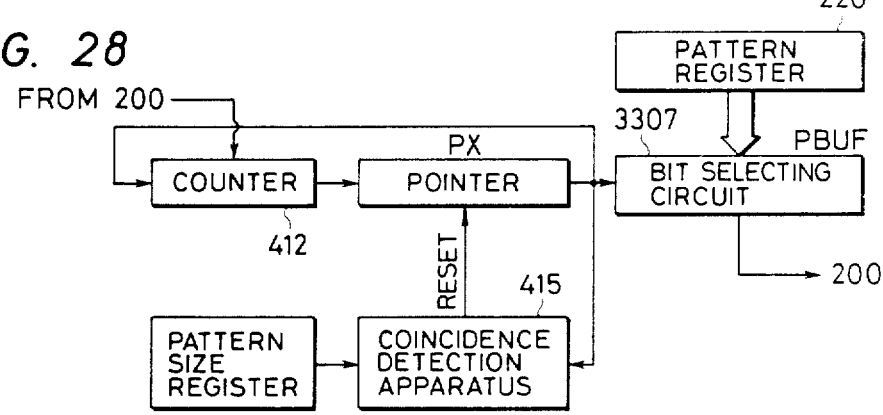
FIG. 28 is a block diagram showing still another embodiment in case line and design patterns are to be drawn in the case of a line drawing.

FIG. 28 shows a further embodiment of the present invention, which is constructed of a pattern register 220, the bit selecting circuit 3307, a pattern pointer PX, a counter 412, pattern size registers SX and EX, and a coincidence detector 415. The pattern register 220 is to store the line pattern data. The pattern pointer PX indicates the reference position of the pattern and is incremented by +1 when a count signal is fed to the counter with each reference to the pattern. On the other hand, the output of the pattern pointer PX and the values preset in the pattern size registers SX and EX are compared by the coincidence detector 415 so that a reset signal is fed to the pattern pointer PX in case the coincidence holds. The bit selecting circuit 3307 sequentially outputs the line patterns in accordance with the increment of the pattern pointer PX. The pattern data thus outputted is referred to, when a figure is made, thereby to form a figure of a predetermined pattern on the frame memory 13 either as they are as the data "0" or "1" or after they have been converted into the color data.

Figure 29:
FIGS. 29(a) and (b) are diagrams showing an example of the bit structure of FIG. 28.

FIGS. 29(A) and (B) show one example of the operations of the embodiment of FIG. 28. It is assumed that the pattern register 220 of eight bits stores the pattern of "11100 . . ." whereas the pattern size register is set with "4". In accordance with this assumption, the data of bits 0 to 4 of the pattern register 220 are repeatedly referred to and outputted.

Thus, according to the present embodiment, it is possible to define line patterns of an arbitrary bit length.

Figure 30:
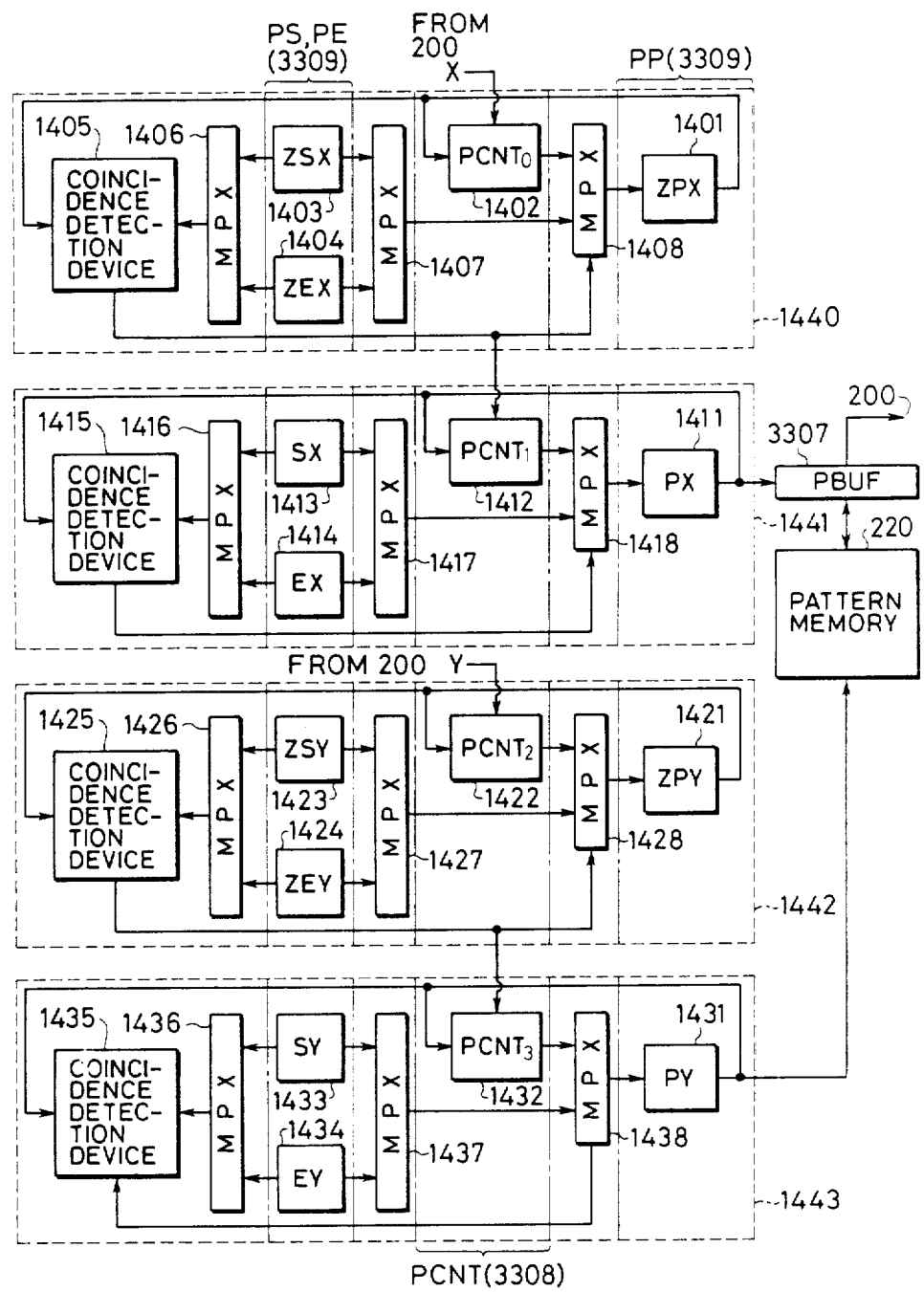
FIG. 30 is a block diagram showing a further embodiment of the present invention.

FIG. 30 shows a further embodiment of the present invention. This embodiment is constructed of a zoom X control unit 1440, a coordinate X control unit 1441, a zoom Y control unit 1442, a coordinate Y control unit 1443, the bit selecting circuit 3307 and the pattern memory 220. In this embodiment, the two-dimensional pattern data can be controlled so that the same coordinate value can be repeatedly referred to independently of the X- and Y-axis directions. Moreover, the moving directions of the coordinate point can be shifted in the two upward and downward directions independently of the X- and Y-axis directions. The zoom X control unit 1440 is composed of a ZPX (i.e., Zoom Point X) register 1401, a counter 1402, a ZSX (i.e., Zoom Start X) register 1403, a ZEX (i.e., Zoom End X) register 1404, a coincidence detecting unit 1405, and multiplexers 1406, 1407 and 1408. The counter 1402 renews, when it receives the count signal in the X-axis direction, the content of the ZPX register (e.g., by +1 in the increment mode and by −1 in the decrement mode). In the case of the increment mode, the multiplexer 1406 selects the ZEX register, and the multiplexer 1407 selects the ZSX register. These are reversed in the case of the decrement mode. The coincidence detector 1405 compares the outputs of the ZPX register 1401 and the multiplexer 1406 to output a coincidence signal. This coincidence signal is fed to the multiplexer 1408 to select the output of the multiplexer 1407. In the other cases, the output of the counter 1402 is selected. Moreover, that coincidence signal acts as the count signal of the coordinate X control unit 1441. Specifically, the operations of the zoom X control unit 1440 will be summarized in the following. In the case of the increment mode, the ZPX register is sequentially incremented by +1 to become coincident with the ZEX register, and the ZSX register is loaded. In the case of the decrement mode, on the contrary, the value of the ZPX register is made coincident with that of the ZSX register, and then the value of the ZEX register is loaded. For the coordinate X control unit 1441, the zoom Y control unit 1442 and the coordinate Y control unit 1443, internal operations similar to those of the zoom X control unit 1440 are conducted. As a result, the content of the PX (i.e., Point X) is renewed in response to the count signal from the zoom X control unit 1440 and is counted repeatedly within the range between an SX (i.e., Start X) 1413 and an EX (i.e., End X) 1414. On the other hand, a ZPY (i.e., Zoom Point Y) 1421 is counted within the range between a ZSY (i.e., Zoom Start) 1423 and a ZEY (i.e., Zoom End Y) 1424, and a PY (i.e., Point Y) 1431 is counted within the range between an SY (i.e., Start Y) 1433 and an EY (i.e., End Y) 1434. The content of the PY 1431 has its corresponding data of one word read out as the address of the pattern memory 220 so that the data of the bit positions by the PX are outputted as the pattern data by the bit selecting circuit 3307.

Figure 31:
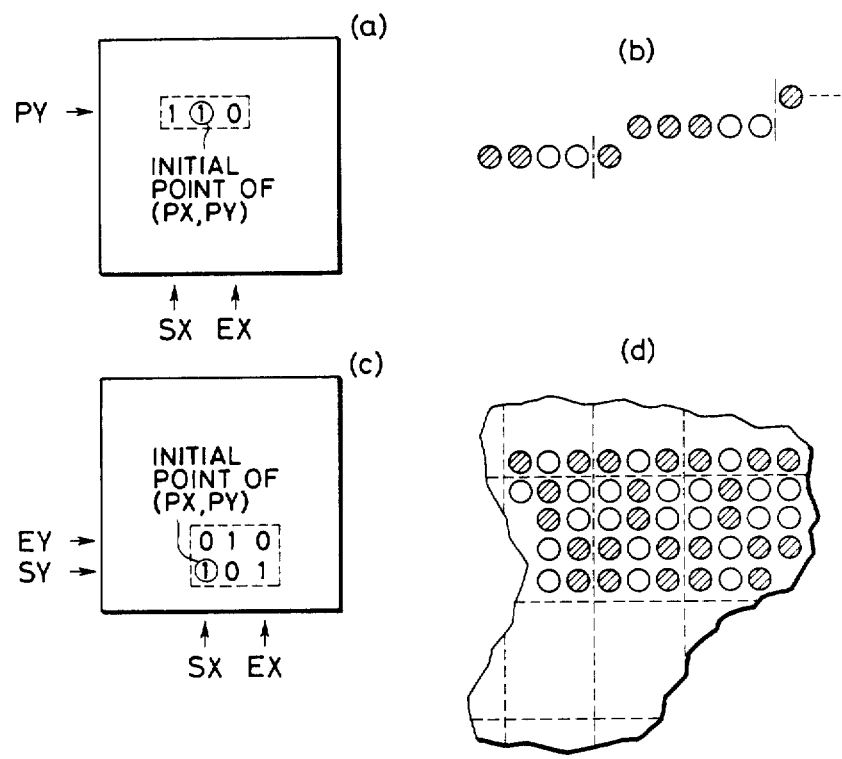
FIGS. 31(a) to (d) are diagrams showing examples of the operations of the embodiment of FIG. 30.

FIG. 31 shows an example of the operations of the embodiment of FIG. 30. FIGS. 31(*a*) and (*b*) show an example of the line drawing operation whereas FIGS. 31(*c*) and (*d*) show an example of plane drawing operation. The examples show the drawings in which the pattern output is exploded into two kinds of color data. In the case of the line drawing operation, such data having the bit number within the range between the SX and the EX as belong to the word designated by the PY in the pattern memory is referred to as the line data. In the case of the plane drawing operation, the region enclosed by the SX, SY, EX and EY is referred to as the design pattern.

Thus, according to the present embodiment, even in the case of either the line or plane drawing operation, such a portion of the pattern memory as has an arbitrary position and an arbitrary size can be used as the line or design pattern, and the number of repetitions of reference to the same coordinate point can be set independently of the X- and Y-axis directions. As a result, the pattern memory can efficiently store a plurality of various patterns. In the present embodiment, moreover, both the increment and decrement of the pattern point can be made so that the pattern point can be shifted in response to any shift of the drawing point. As a result, no discontinuity is made in the development of the pattern even for the complicated smearing process.

What is claimed is:

1. A graphic processing apparatus for controlling preparation and transfer of graphic data to a display memory for storing said graphic data, comprising:

drawing point coordinate value memory means for storing the coordinate values of a drawing point located in a two-dimensional plane and relating to the preparation of said graphic data;

region coordinate value memory means for defining a predetermined region located in said two-dimensional plane and relating to the preparation of said graphic data;

renewal arithmetic means for renewing the coordinate values of said drawing point, which are stored in said drawing point coordinate value memory means, sequentially in accordance with a predetermined drawing operation;

comparing and judging means for comparing the renewed coordinate values produced by said renewal arithmetic means and defined region, which is stored in said region coordinate value memory means, to judge whether the coordinate values of said drawing point are located inside or outside of said defined region; and means for effecting drawing control to display graphic data inside or outside of said defined region in response to said comparing and judging means.

2. A graphic processing apparatus according to claim 1, wherein said region coordinate value memory means includes memory means for setting and storing the maximum and minimum of an X-coordinate and the maximum and minimum of a Y-coordinate by using a rectangular region in said two-dimensional plane as the defined region thereof.

3. A graphic processing apparatus according to claim 2, wherein said renewal arithmetic means renews the x- or y- axis coordinate value of the coordinate values of said drawing point on the basis of the values which are stored in said drawing point coordinate value memory means, and wherein said comparing and judging means includes a comparator for comparing the output content of said renewal arithmetic means and the minimum or maximum of the corresponding x-coordinate or the y-coordinate of the content of said region coordinate value memory means to juidge whether or not the coordinate values of said drawing point are located between the defined minimum and maximum.

4. A graphic processing apparatus according to claim 3, wherein said comparator includes means for storing the compared and judged result between the value renewed by said renewal arithmetic means and said region coordinate values.

5. A graphic processing apparatus according to claim 1, wherein said drawing control effecting means is responsive to said comparing and judging means for effecting display of graphic data only for drawing points in said defined region.

6. A graphic processing apparatus according to claim 1, wherein said drawing control effecting means is responsive to said comparing and judging means for effecting display of graphic data only for drawing points in said defined region, and for setting a detection flag when the coordinate values of said drawing point are outside said defined region.

7. A graphic processing apapratus according to claim 1, wherein said drawing control effecting means is responsive to said comparing and judging means for effecting display of graphic data only for drawing points in said defined region, and for setting a deflection flag and interrupting the operation of said renewal arithmetic means when the coordinate values of said drawing point are outside said defined region.

8. A graphic processing apparatus according to claim 1, wherein said drawing control effecting means is responsive to said comparing and judging means for effecting display of graphic data only for drawing points outside said defined region.

9. A graphic processing apparatus according to claim 1, wherein said drawing control effecting means is responsive to said comparing and judging means for effecting display of graphic data only for drawing points outside said defined region, and for setting a detection flag when the coordinate values of said drawing point are outside said defined region.

10. A graphic processing apparatus according to claim 1, wherein said drawing control effecting means is responsive to said comparing and judging means for effecting display of graphic data only for drawing points outside said defined region, and for setting a deflection flag and interrupting the operation of said renewal arithmetic means when the coordinate values of said drawing point are inside said defined region.

11. A graphic processing apparatus comprising: first means for storing graphic data; second means for storing predetermined drawing picture element data; and third means for conducting arithmetic processing between the data read out from said first means and the data read out from said second means, so that the graphic processing is conducted by writing the arithmetic result of said third means in said first means; fourth means for comparing the data read out from said first means and predetermined reference picture element data; and fifth means for controlilng the arithmetic processing in said third means or the writing in said first means in dependence upon the compared result of said fourth means.

12. A graphic processing apparatus according to claim 11, wherein said fourth means compares the data read out from said first means and the drawing picture element data stored in said second means.

13. A graphic processing apparatus according to claim 11, further comprising fifth means for storing said predetermined reference picture element data so that said fourth means compares the data read out from said first means and the reference picture element data stored in said fifth means.

14. A graphic processing apparatus as set forth in claim 11, further comprising sixth means for designating a partial field of one drawing picture element data so that only the partial field designated by said sixth means is compared by said fourth means.

15. A graphic processing apparatus according to claim 11, further including means for controlling the display of graphic data so that only predetermined color data is displayed.

16. A graphic processing apparatus according to claim 11, further including means for controlling the display of graphic data so that predetermined color data is inhibited from being displayed.

17. A graphic processing apparatus according to claim 11, further including means for controlling the display of graphic data so that color data having a larger area is preferentially displayed among plural color data.

18. A graphic processing apparatus according to claim 11, further including means for controlling the display of graphic data so that color data having a smaller area is preferentially displayed among plural color data.

19. A graphic processing apparatus comprising means for storing a drawing pattern of a line or design pattern so that drawing processing may be conducted on the basis of the drawing pattern stored in said means, wherein the improvement comprises:
   drawing renewal means for renewing the reference position of said drawing pattern in synchronism with the drawing operation;
   a pattern size register for setting and storing a pattern reference range as a pattern size;
   coincidence detecting means for detecting the coincidence between said renewed reference position and said set reference range and for outputting a signal for initializing said drawing renewal means when said coincidence is detected; and
   output means for selectively outputting the data of said reference position in response to the output signal of said drawing renewal means, whereby the output of said selective output means is used as data for controlling a graphic pattern which is formed on an image memory.

20. A graphic processing apparatus according to claim 19, wherein said pattern size register includes: a starting point register stored with a starting point desginated; and an ending point register stored with an ending point, whereby said drawing pattern is clipped at an arbitrary position.

21. A graphic processing apparatus according to claim 19, wherein said drawing renewal means includes means for setting the number of repetitions, in which the drawing of the designated position of said drawing pattern is repeated, so that the renewal of the drawing is conducted after the repetition of said repetition number.

22. A graphic processing apparatus according to claim 19, wherein said memory means is stored with a two-dimensional drawing pattern, and wherein said drawing renewal means, said pattern size register and said coincidence detecting means are provided by two in number, respectively, for the and y-axis coordinates so that the data of the reference position of said two-dimensional drawing pattern are selectively outputted to conduct the two-dimensional drawing.

* * * * *